(12) United States Patent
Decherd et al.

(10) Patent No.: US 8,230,333 B2
(45) Date of Patent: Jul. 24, 2012

(54) ANALYSIS OF TIME-BASED GEOSPATIAL MASHUPS USING AD HOC VISUAL QUERIES

(75) Inventors: Alexander Decherd, Barrington, IL (US); Colin Alworth, Lisle, IL (US); Brian Horst, Naperville, IL (US); Kurt David Rivard, Naperville, IL (US); Stephen Gregory Eick, Naperville, IL (US); M. Andrew Eick, Farmington Hills, MI (US); Andrzej Wolosewicz, Brookfield, IL (US); James Kowalski, Aurora, IL (US); Jesse Adam Fugitt, Oswego, IL (US)

(73) Assignee: VisTracks, Inc., Lisle, IL (US)

( * ) Notice: Subject to any disclaimer, the term of this patent is extended or adjusted under 35 U.S.C. 154(b) by 1242 days.

(21) Appl. No.: 12/005,334

(22) Filed: Dec. 26, 2007

(65) Prior Publication Data

US 2009/0172511 A1 Jul. 2, 2009

(51) Int. Cl.
G06F 17/00 (2006.01)

(52) U.S. Cl. ....................................................... 715/243

(58) Field of Classification Search .................. 715/273, 715/243; 705/7.34, 26.1
See application file for complete search history.

(56) References Cited

U.S. PATENT DOCUMENTS

| | | | |
|---|---|---|---|
| 7,117,443 B1 * | 10/2006 | Zilka et al. | 715/739 |
| 7,149,698 B2 * | 12/2006 | Guheen et al. | 705/319 |
| 7,650,294 B1 * | 1/2010 | Carter et al. | 705/7.25 |
| 7,673,340 B1 * | 3/2010 | Cohen et al. | 726/22 |
| 7,899,707 B1 * | 3/2011 | Mesaros | 705/14.66 |
| 2002/0178085 A1 * | 11/2002 | Sorensen | 705/26 |
| 2003/0043191 A1 * | 3/2003 | Tinsley et al. | 345/762 |
| 2005/0149398 A1 * | 7/2005 | McKay | 705/14 |
| 2005/0172231 A1 * | 8/2005 | Myers | 715/716 |
| 2007/0234196 A1 * | 10/2007 | Nicol et al. | 715/501.1 |
| 2007/0245238 A1 * | 10/2007 | Fugitt et al. | 715/700 |
| 2008/0147623 A1 * | 6/2008 | Swaminathan et al. | 707/3 |
| 2008/0172632 A1 * | 7/2008 | Stambaugh | 715/781 |
| 2008/0195456 A1 * | 8/2008 | Fitzpatrick et al. | 705/9 |
| 2008/0235631 A1 * | 9/2008 | Fuchs et al. | 715/853 |
| 2008/0282139 A1 * | 11/2008 | Davis | 715/205 |
| 2008/0288306 A1 * | 11/2008 | MacIntyre et al. | 705/7 |
| 2009/0030787 A1 * | 1/2009 | Pon et al. | 705/14 |
| 2009/0158200 A1 * | 6/2009 | Palahnuk et al. | 715/781 |

* cited by examiner

*Primary Examiner* — Laurie Ries
(74) *Attorney, Agent, or Firm* — Carmen Patti Law Group, LLC

(57) ABSTRACT

An apparatus in one example has an analytical environment for mashup data having visual analysis metaphors, and linking and correlation functionality among the visual analysis metaphors. A system may have: at least one store having a predetermined floor plan layout; at least one predetermined location on the predetermined floor plan layout for displaying at least one product; analytical environment for mashup data having visual analysis metaphors, the mashup data formed from data indiciative of the predetermined floor plan layout, and data indicated of sales of the at least one product; and linking and correlation functionality among the visual analysis metaphors through a web browser. In one example, a plurality of products may be positioned on a plurality of shelves, and may be depicted in a geographical display. Sales of each product may be depicted in a in time line display that is linked to the geographical display.

18 Claims, 23 Drawing Sheets

```
<ITEM>
  <ORANGE LINE </ID>
  <THINCML:NAME>ORANGE LINE</THINCML:NAME>
  <SOURCE>1</SOURCE>
  <TITLE>ORANGE LINE</TITLE>
  <DESCRIPTION>METRORAIL ORANGE LINE</DESCRIPTION>
  <CATEGORY>PATH</CATEGORY>
  -<THINCML:STYLE>
    <THINCML:FILLCOLOR>ORANGE</THINCML:FILLCOLOR>
    <THINCML:STROKECOLOR>ORANGE</THINCML:STROKECOLOR>      ← THINCML NAMESPACE EXTENSIONS
    <THINCML:STROKEOPACITY>1.0</THINCML:STROKEOPACITY>
    <THINCML:STROKEWIDTH>4</THINCML:STROKEWIDTH>
    <THINCML:HIGHLIGHTEDSTROKEWIDTH>8</THINCML:HIGHLIGHTEDSTROKEWIDTH>
    <THINCML:SELECTEDSTROKEWIDTH>6</THINCML:SELECTEDSTROKEWIDTH>
  </THINCML:STYLE>
  -<GEORSS:WHERE>
    -<GML:LINESTRING SRSNAME="EPSG:63266405">                ← GEORSS NAMESPACE EXTENSION
      <GML:POSLIST>
        -77.271562 38.877693 -77.228939 38.883015 -77.189394 -77.157177 38.885841 -77.111845 38.882071 -77.1031
        -76.948042 38.898284 -76.936177 38.907734 -76.915427 38.91652 -76.890988 38.934411 -76.872144 38.947674
      </GML:POSLIST>
    </GML:LINESTRING>
  </GEORSS:WHERE>
</ITEM>
```

FIG. 10

| NAME | TYPE | URL | ADD FEED |
|---|---|---|---|
| METRO ROUTES | GEORSS | HTTP://LOCALHOST:49500/XML/DCMETRO... | X |
| METRO STOPS | GEORSS | HTTP://LOCALHOST:49500/XML/DCMETRO... | X |
| D.C. CRIMES | GEORSS | HTTP://LOCALHOST:49500/XML/LIVE FEED... | X |
| GRAPH DEMO | GEORSS | HTTP://LOCALHOST:49500/XML/LIVE FEED... | X |
| ALERTS FEED1 | GEORSS | HTTP://LOCALHOST:49500/LOCALALERTS.ASOX | X |
| NTIF DEMO | GEORSS | HTTP://192.168.7.108:8080/NITFGEO... | X |
| AIS DEMO | GEORSS | HTTP://192.168.7.26/AIS/AIS.XML | X |
| EARTH QUAKES | GEORSS | HTTP://EARTHQUAKE.USGS.GOV/EQCENTER/... | X |
| NAIS | REST | HTTP://LOCALHOST:49500/LOCALNAIS.ASOX | X |
| LIVEFEED 1 | REST | HTTP://LOCALHOST:49500/SIMULATEDFEE... | X |
| SOS(IRAD) SHIPS | REST | HTTP://192.168.7.33.1212/NAI%20SE... | X |
| SOS(IRAD) ZONES | REST | HTTP://192.168.7.33.1212/NAI%20SE... | X |
| SOS(IRAD) CITIES | REST | HTTP://192.168.7.33.1212/NAI%20SE... | X |

OK  CANCEL

FIG. 11

ANALYSIS OF TIME-BASED GEOSPATIAL MASHUPS USING AD HOC VISUAL QUERIES

CROSS-REFERENCE TO RELATED APPLICATIONS

This application is related to U.S. patent application Ser. No. 11/670,859, filed Feb. 2, 2007, which is hereby incorporated by reference.

FIELD OF THE INVENTION

This invention is directed to interactive, browser-based Internet applications and web pages.

BACKGROUND

"Web 1.0" is the term associated with the first generation of internet browser applications and programs, along with the associated client-side software entities and server-side software entities used to support and access information using the Internet. Such Web 1.0 technologies, like most first-generation technologies, are geared more to enabling a workable system and to the capabilities of the available software and hardware platforms, rather than to creating a rich and efficient experience for the system's users. Thus, conventional Web 1.0 technologies, while efficient for machines, are often highly inefficient and frustrating for their human users.

In particular, Web 1.0 technologies operate on a "click-wait" or a "start-stop" philosophy. That is, when a user wishes to view a web page, the user must generate a request using the client-side browser software, and send that request to the server. The user must then wait for the server to respond to the request and forward the requested data. The user must further wait for all of the requested data to be received by the client-side browser software and for the browser software to parse and display all of the requested information before the user is allowed to interact with the requested web page.

This is frustrating for most users on a number of levels. First, for slow or bandwidth-limited Internet connections, obtaining all of the requested data can often take a relatively long time. Furthermore, even when the user has high-speed access to the Internet, a web page that requires data to be re-loaded or refreshed on a fairly regular basis, such as mapping web pages, sporting events scores, or play-by-play web pages and the like, can cause significant delays. This is typically due to Web 1.0 requirements that the entire web page be retransmitted even if no or only minimal changes have occurred to the displayed information.

Accordingly, the next generation of technologies used to access and support the Internet is currently being developed and collected under the rubric "Web 2.0". A key feature in the "Web 2.0" concept is to eliminate the above-outlined "click-wait" or "start-stop" cycle, by asynchronously supplying data associated with a particular web page to the user from the associated web server. The transfer occurs as a background process, while a user is still viewing and possibly interacting with the web page, which anticipates the fact that the user will wish to access that asynchronously-supplied data. A number of important technologies within the "Web 2.0" concept have already been developed. These include "AJAX", SVG, and the like.

Asynchronous JavaScript and XML, or "AJAX", is a web development technique used to create interactive web applications. AJAX is used to make web pages feel more responsive by exchanging small amounts of data between the client application and the server as a background process. Accordingly, by using AJAX, an entire web page does not have to be re-loaded each time a portion of the page needs to be refreshed or the user makes a change to the web page at the client side. AJAX is used to increase the web page's interactivity, speed, and usability. AJAX itself makes use of a number of available techniques and technologies, including XHTML (extended hypertext markup language) and CSS (cascading style sheets), which are used to define web pages and provide markup and styling information for the web pages. It also makes use of a client-side scripting language, such as JavaScript, that allows the DOM (document object model) to be accessed and manipulated, so that the information in the web page can be dynamically displayed and can be interacted with by the user.

Other important technologies include the XMLHttpRequest object, which is used to exchange data asynchronously between the client-side browser software and the server supporting the web page being displayed, and XML, RSS and other data exchange standards, which are used as the format for transferring data from the server to the client-side browser application. Finally, SVG (scalable vector graphics) is used to define the graphical elements of the web page to be displayed using the client-side browser application.

In addition to Web 1.0 and Web 2.0 technologies, an entirely different set of software technologies are used to access other data available over local area networks, wide area networks, the internet and the like. These technologies are traditionally referred to as "client-server applications", where a complex software application having a rich set of features is installed on a particular client computer. This software application executes on the client computer and is used to access, display and interact with information stored on a server that is accessed via a local area network, a wide area network, the Internet or the like. While such client-server applications allow for dynamic displays and make manipulating information easy, such client-server applications are difficult to deploy to all of the client machines, and are difficult to update.

Timelines for displaying data are known. The SIMILE project has a thin client Timeline that is interactive. However, it lacks many desirable features. For example, there is no toolbar that is able to interact with the Timeline. Also, the SIMILE timeline only supports a proprietary data format and does not ingest standard formats like RSS and GeoRSS. Once the data is read in, it does not link to other visualizations or support selection or highlighting. The ability to zoom in or out and the ability to change scales are also not included in SIMILE's Timeline.

The focus of "Business Intelligence" is to enable corporations to analyze their business data and gain insights that result in better business performance. Business Intelligence software vendors have been successful by providing better reporting tools, analytic dashboards, and data analysis capability that help corporations improve operating efficiency. One type of data that is underutilized by Business Intelligences systems is that involving locations. It is estimated that 80% of all data maintained by corporations has a location component. Location data is either stored directly, such as storing the latitude and longitude of tracked objects in a database, or the location is implied, such as storing the street address which can be decoded into geo-coordinates. In the past, geographic data was passed to the GIS (Geographic Information System) department for processing where reports were prepared for the analysts and decision makers. These GIS systems were heavy desktop applications, which needed dedicated machines and highly trained staff to use.

This process was often lengthy, and therefore rarely used by analysts needing to make quick decisions.

Location data is traditionally latitude-longitude based data. Map companies, for example, present information in the form of latitude-longitude based data. Items that have map based coordinates may include merchandise shelf position or aisle location in a store.

Planograms are also a tool used by retailers to optimize the layout and location of merchandise. In this application the planogram is a visual planning tool used by merchants and planners to analyze, plan and communicate to stores how product should be laid out and configured. Retailers utilize this application of the planogram more than consumer goods manufacturers. For the most part, retailers guard their planograms closely as competitive information.

Recently, with advances in hardware technology and the emergence of "Web 2.0 AJAX" applications, these untapped location data sources can now be made available to users. Thin client, geospatial mapping platforms provide innovative GIS functionality. These platforms are inexpensive, are bundled with image and map content, provide rich functionality, and are totally browser-based. Today, it is possible to do live interactive maps without needing to install complex client software. As a result they have dramatically broadened access to GIS and mapping technology.

In parallel with the emergence of these thin client GIS web platforms, new standards have emerged for publishing and consuming geo-encoded information. Three standards are widely used. First, GeoRSS is a rather simple extension of RSS, an XML specification for publishing information best described as a sequence of items in channels. GeoRSS extends RSS by including geographical encodings to describe the location of the event items. These encodings can range from a simple Latitude/Longitude point location up to a complex polygon describing a geographical region. These points are encoded using the GML (geographic markup language) standard. Second, KML (Keyhole Markup Language, named after the company which developed it, Keyhole Technologies) is the language used to describe three dimensional spatial planes. Third, GPX is a standard popularized by Garmin GPS units to encode "GPS Tracks" of the device. These formats are similar enough that many open source programs exist to translate between the three data formats.

Web applications that combine geospatial maps with geo-encoded information from various sources are often called mashups. Mashups typically take spatial and non-spatial data, combining or "mashing" the data sets together to a display. Common examples of mashups are "Amazon book purchases overlaid by region," "Real estate price by neighborhood," and "earthquake events published by the USGS" plotted geospatially on a Google Map. Although the public domain data was always available, the merging of the data onto a map was difficult. What has changed is that good-enough GIS software is widely available and interesting geo-encoded datasets are now published using geospatial standards. As a result, the number of mashup applications has grown dramatically and there are literally hundreds of thousands of mashup sites.

SUMMARY

One embodiment of the present method and apparatus encompasses an apparatus. This embodiment of the apparatus may comprise an analytical environment for mashup data having visual analysis metaphors, and linking and correlation functionality among the visual analysis metaphors.

In another example a system may have: at least one store having a predetermined floor plan layout; the at least one store having at least one predetermined location on the predetermined floor plan layout for displaying at least one product; analytical environment for mashup data having visual analysis metaphors, the mashup data formed from data indiciative of the predetermined floor plan layout of the at least one store, and data indicated of sales of the at least one product; and linking and correlation functionality among the visual analysis metaphors that enables interaction and interrogation of the mashup data through a web browser. Another embodiment of the present method and apparatus encompasses a system. This embodiment of the system may comprise: at least one store; at least one customer segment, each customer segment having a respective shopping pattern, wherein at least one of the shopping patterns occurs in at least one of the stores; at least one customer transaction, the customer transaction occurring in a respective store of the plurality of stores by a customer in a respective customer segment of the plurality of customer segments; analytical environment for mashup data having visual analysis metaphors, the mashup data formed form data indicative of the at least one store, the at least one customer segment, at least one shopping pattern, and at least one customer transaction; and linking and correlation functionality among the visual analysis metaphors that enables interaction and interrogation of data through a web browser.

BRIEF DESCRIPTION OF DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 10 illustrates one exemplary embodiment of a GeoRSS item for which properties are set for a default drawing style according to the present method and apparatus;

FIG. 11 illustrates one exemplary embodiment of GeoRSS feeds ingested in the FIG. 9 embodiment according to the present method and apparatus;

DETAILED DESCRIPTION

Figure 1:
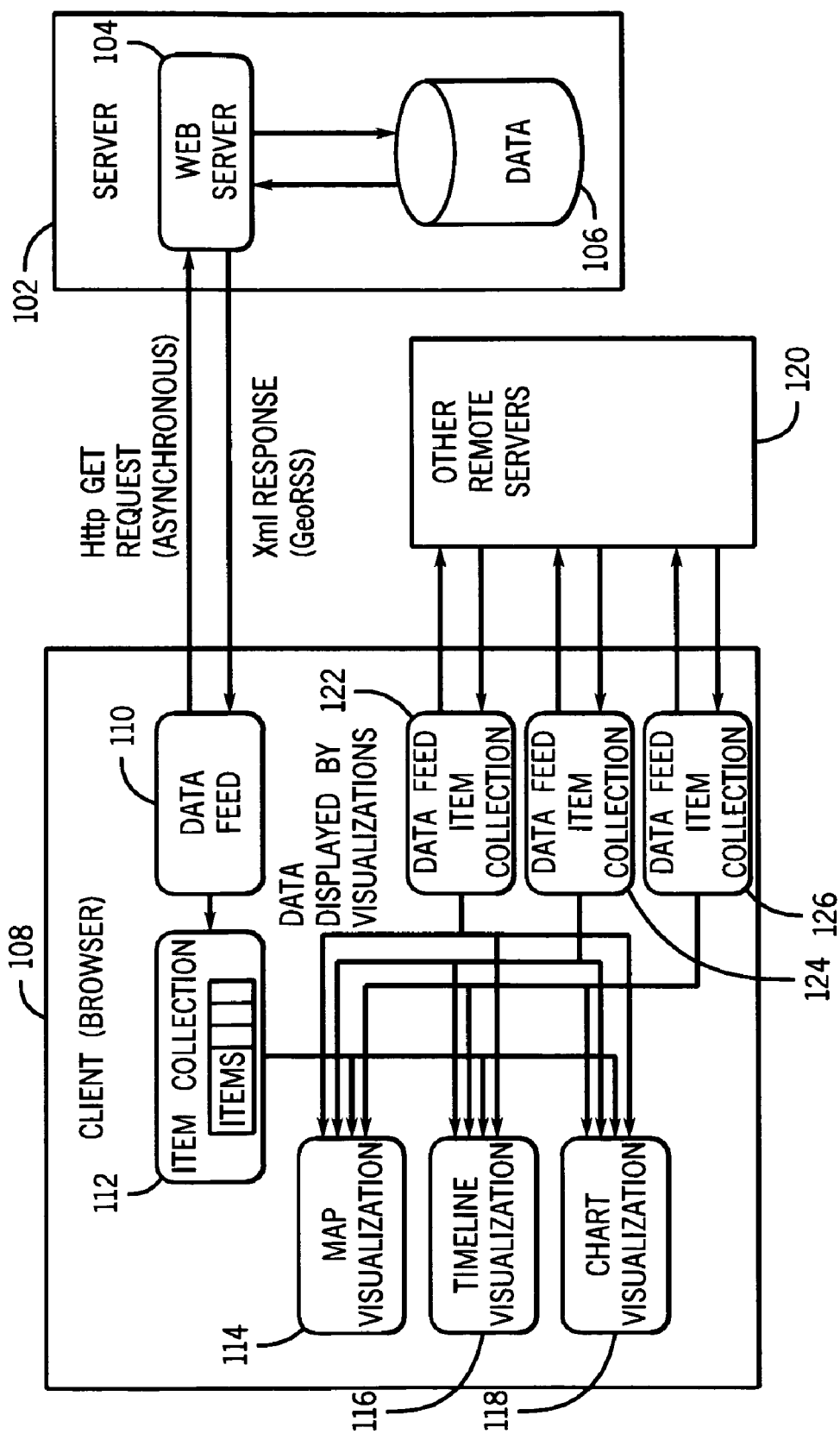
FIG. 1 illustrates one exemplary embodiment of a GeoRSS mashup according to the present method and apparatus.

The following terms are used in the description of the present apparatus and method.

RSS (formally "RDF Site Summary", known colloquially as "Really Simple Syndication") is a family of Web feed formats used to publish frequently updated content such as blog entries, news headlines or podcasts. An RSS document, which is called a "feed", "web feed", or "channel", contains either a summary of content from an associated web site or the full text.

GeoRSS is an emerging standard for encoding location as part of an RSS feed. (RSS is an XML format used to describe feeds ("channels") of content, such as news articles, MP3 play lists, and blog entries. These RSS feeds are rendered by programs such as aggregators and web browsers.) In GeoRSS, location content consists of geographical points, lines, and polygons of interest and related feature descriptions. GeoRSS feeds are designed to be consumed by geographic software such as map generators.

Representational State Transfer (REST) is a style of software architecture for distributed hypermedia systems such as the World Wide Web. REST refers to a collection of network architecture principles that outline how resources are defined and addressed. The term is often used in a looser sense to describe any simple interface that transmits domain specific data over HTTP without an additional messaging layer. An important concept in REST is the existence of resources (sources of specific information), each of which can be referred to using a global identifier (a URI). In order to manipulate these resources, components of the network (clients and servers) communicate via a standardized interface (e.g. HTTP) and exchange representations of these resources (the actual documents conveying the information). The World Wide Web is the key example of a REST design. Much of it conforms to the REST principles. The Web consists of the Hypertext Transfer Protocol (HTTP), content types including the Hypertext Markup Language (HTML), and other Internet technologies such as the Domain Name System (DNS).

GData provides a simple standard protocol for reading and writing data on the Internet. GData combines common XML-based syndication formats (such as, RSS) with a feed-publishing system.

Generalized Markup Language (GML) is a set of macros that implement intent-based markup tags.

Embodiments of the present method and apparatus relate to developing mashup sites for analyzing time-stamped, geo-encoded business data. This type of data is quite common and includes, for example, streams of news articles where the events in the articles are geo-located, the sequence of observed positions of a delivery vehicle as recorded by an onboard GPS, the positions of emergency personnel with active RFID badges in a hospital, and even the times and locations of Avian Flu Pandemic as reported by the government.

Although it is possible to display this information using Google's or Microsoft's mapping applications, these platforms do not permit rich analysis. The problem is that these web-mapping applications are intended to support searching and to serve up advertising. Both Google's and Microsoft's sites are advertising supported. Thus the APIs for these applications are optimized to provide local searching, directions and to serve up relevant ads. Using these platforms it is not possible to correlate geospatial information by time, by event type, by trend, etc. to discover important analytical relationships. Furthermore, traditional GIS applications focus on geospatial data organized into layers. They are optimized to support hundreds of layers displayed spatially. When all the layers are presented simultaneously on a map, the displays become visually cluttered and confusing. The problem is that there is a need to correlate both the spatial and non-spatial dimensions. Some of the most interesting analytical insights often come from understanding how spatial and non-spatial relationships evolve through time.

To address this need embodiments of the present method and apparatus utilize a Web 2.0 AJAX web mapping application, referred herein to thincVIew™, aimed at the business intelligence market. This technology shows geospatial information on a lightweight map, on a timeline, and in linked analysis charts. Presenting the information in multiple views enables analysts to correlate the dimensions and discover relationships that are hidden when the data is displayed in a single perspective. As a result they are able to perform richer and deeper analysis. This enables users to find patterns that are hidden in existing presentations.

Although "linked view" visualization systems are well known, embodiments of the present method and apparatus have a feature in that it is totally browser-based. However, in addition to light weight maps, embodiments of the present method and apparatus may have a set of thin client visualization components, e.g. timeline, time wheel, node and link graphs, and standard business charts that work with web applications to provide a rich analysis environment. Such web applications are nearly as responsive and dynamic as the incumbent thick desktop applications. Further, the analysts using this technology may explore ad-hoc and "what-if" scenarios. With this web application analysts are able to combine data sources to create a mashup web site and then on the fly instantiate linked analysis charts. Then using sweep selects, highlighting, or filtering, analysts may interact with any of the charts to explore different dimensions of the data. In this way, they are able to discern patterns hidden in the data, giving them different insights into the problem.

Embodiments of the present method and apparatus in a web application implements and extends many of the ideas embodied in traditional mashups. It can ingest live or static data from several different sources and present it for rich analysis. Furthermore, by building on web technology, ideas from the social networking sites may be used. Analysts may edit and annotate the information in the web application and thereby create work products. The edits and annotations may propagate automatically to other browsers on the site.

Embodiments of the present method and apparatus may have an AJAX web application for analyzing time-stamped geospatial mashup data. It is a feature of the embodiments of the present method and apparatus that the web application is to provide an analytical environment that enables users to display time-stamped geospatial event data on a map and in linked visualization components. The framework provides an environment for correlating among the visual components so that analysts may perform multi-dimensional spatial analysis. These components present mashup data spatially on a map, temporally on a timeline and cyclically on a time wheel. The components are linked so that interactive operations, e.g. selection, tooltips, highlighting, automatically propagate to other components on the page. The components are particularly rich and include many features for understanding time-oriented event data.

FIG. 1 illustrates one exemplary embodiment of a GeoRSS mashup according to the present method and apparatus.

The FIG. 1 block diagram is a general view of the GeoRSS Mashup (thincVIew). In this embodiment a server 102 is operatively coupled to a client (browser) 108. The server 102 may have a web server 104 that is operatively coupled to data in a database 106. The web server 104 in the server 102 communicates with a data feed 110 via Http Get Request (Asynchronous). The data feed is operatively coupled to a Item Collection 112 which is operatively coupled to a map visualization 114, a timeline visualization 116, and chart visualization 118. Other remote servers 120 may be operatively coupled to data feed and item collections 122, 124, and 126.

Mashups are widely used for understanding geospatial data. It is another feature of the embodiments of the present method and apparatus that there is an analytical environment for mashup data. Previous approaches toward mashup focused on presenting mashup data spatially. In the present embodiments the presentation is extended by adding a timeline and other visual analysis metaphors and enriched it by adding linking and correlation capability among the visual metaphors.

By cleverly using AJAX technology, ideas from real-time monitoring and situational awareness are incorporated directly into the framework and the components. The value of this is that attaching the web application to a live data stream is the same operation as analyzing a fixed data source. A unified model handles live and static data.

The software is built around lightweight web protocols. By incorporating web technology, many of the most significant ideas from the web including open standards, real-time collaboration, and flexible but simple data models are included. In one embodiment, focus is on ingesting RSS and GeoRSS data streams. RSS has become the standard way that streaming information is published on the web. By embracing this format, embodiments of the present method and apparatus fit naturally into existing web infrastructures. REST and GDATA may be used to access and publish information and thus fit in the Google's Web App model, for example.

Each of the visual components is live, dynamic and interactive. The visual components are building blocks that enable web authors to publish time-oriented geospatial content. The visualizations are live, meaning they automatically ingest new information as the information providers publish it. New events are placed automatically on the maps and in other visual components within a second or two after they are published. Special features may be added such as event "fade out" to support real-time monitoring tasks and situational awareness.

Although linked view visualization components are not new, the present approach toward them is completely new. A linked view visualization system may be completely incorporated in a browser using JavaScript built around ideas from RSS. Often JavaScript web applications suffer from performance problems. The present JavaScript library overcomes this limitation for many visualization tasks. What is rather remarkable is how well it works. The interactive performance of the components is often faster than equivalent desktop software.

In one embodiment the thincVIew is an AJAX thin client web application. It contains no Java Applets and the client is written entirely in JavaScript and HTML. Building a cross-platform enterprise AJAX application is extremely difficult. There are many subtle issues involving security, timing, JavaScript, proxies, etc. that make the programming challenging. One approach of the present embodiments toward overcoming these issues involves breaking the problem up into layers and creating a JavaScript class library that is referred to as thinc™.

The thincVIew Map, Timeline, TimeWheel and other visual components are implemented using a set of JavaScript classes built using the thinc JavaScript library. Using thinc components an application developer can create advanced, lightweight browser-based visualizations and mashups. The overall architecture consists of data components, visualization components, and framework/utility components. From a data ingestion perspective, there are several classes that allow the framework to pull in RSS and GeoRSS data feeds. As pointed out in the introduction, RSS is a simple protocol for publishing information. The basic content of an RSS stream is a set of metadata tags organized into items that describe content. The required tags in each item are <title>, <link>, <description>, <pubDate>, <guid>. The <link> tag is generally a hyperlink to retrieve the item content. Extending RSS with namespace extensions allows data to be added to a standard RSS feed without breaking existing parsers that understand RSS. GeoRSS extends RSS by adding location information.

By default, thincVIew uses an XmlHttpRequest wrapper classes to asynchronously retrieve XML data from the server. This is how the web clients pull RSS and GeoRSS events asynchronously from the server. The advantage of this approach is that XML data is quite standard and well understood. The disadvantage is that parsing XML data on a JavaScript client is somewhat cumbersome and slow. Recently, however, it has become popular in mashup applications to use the HTML <script> tags as a transport mechanism for pulling events from a server to a JavaScript client. Once transported, the client can quickly consume the data, since the transformation from GeoRSS to native JavaScript data is no longer needed. Support for JSON (JavaScript Object Notation) items may be implemented so that once the data arrives on the client, the data items are parsed directly into an item collection.

The thinc JavaScript framework includes various utility components to make creating visualizations easier. It uses an abstract rendering library to separate vector-drawing functions inside the visualizations from the specific rendering API. It currently supports both SVG and Silverlight 1.0 drawing APIs. These APIs are currently the most standardized vector drawing language available in modern web browsers. By supporting different underlying renderers in the present framework, the visualizations can run in a variety of web browsers depending on which vector languages they support.

Figure 2:
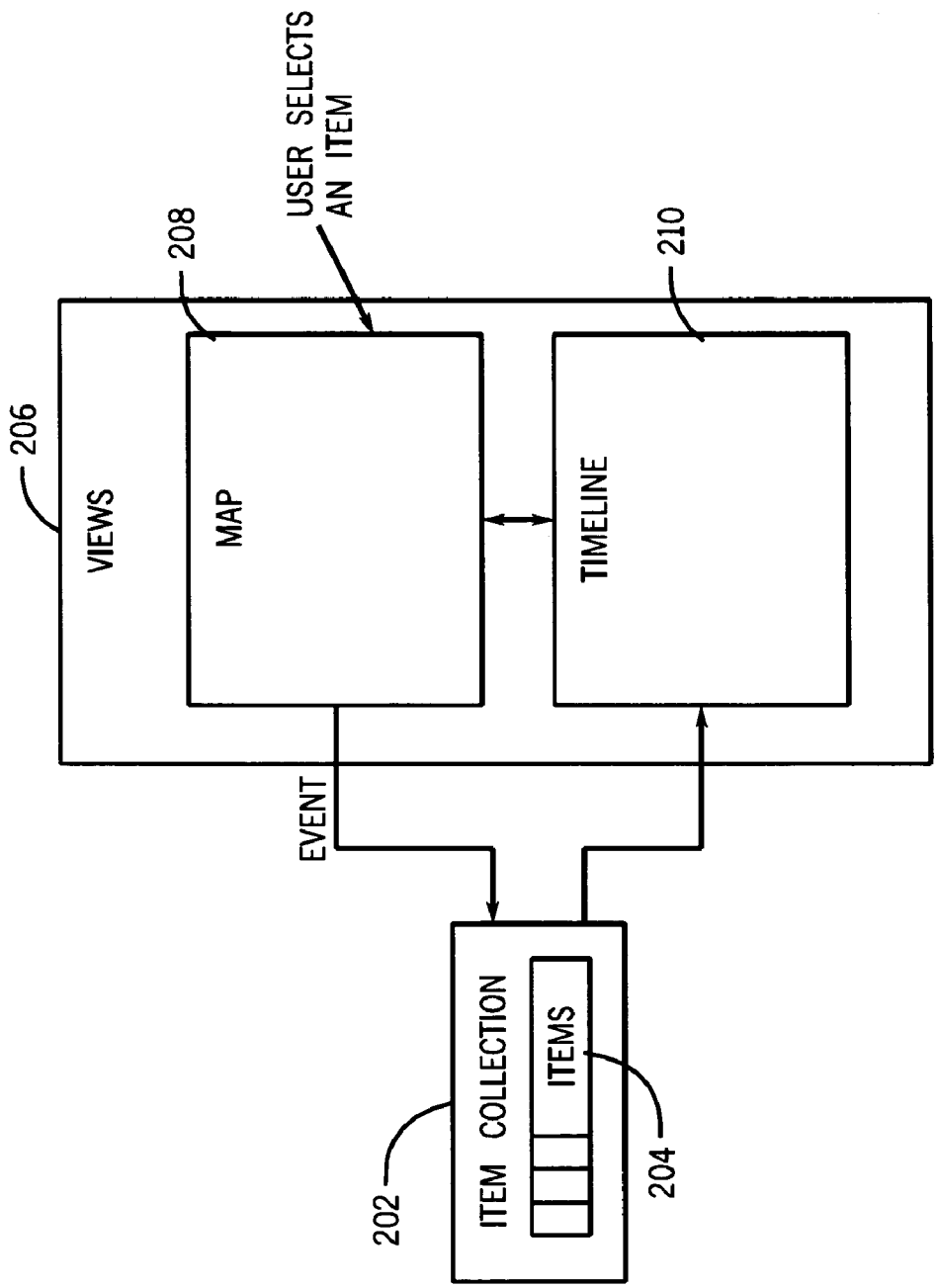
FIG. 2 illustrates one exemplary embodiment of linked visualizations feature of the present method and apparatus.

FIG. 2 illustrates one exemplary embodiment of linked visualizations feature of the present method and apparatus.

For linked visualizations an item collection 202 having items 204 may in general be coupled to views 206. The views 206 may have at least a map 208 and a timeline 210 that are linked as is explained below. A user is able to select items in the map 208.

The basic idea in the thinc JavaScript framework is that data is represented using an ItemCollection class, which is modeled after GeoRSS. By default, each data item has all of the attributes from the GeoRSS feed. thincVIew visual components display data taken from ItemCollections. If two components are displaying the same ItemCollection, they are automatically linked via tooltips, selection, and highlighting. Item collections may be created and updated programmatically, via JSON, or by monitoring RSS publishers. Once a data item collection is loaded, it can be passed to one of the many visualization classes to be rendered.

Figure 3:
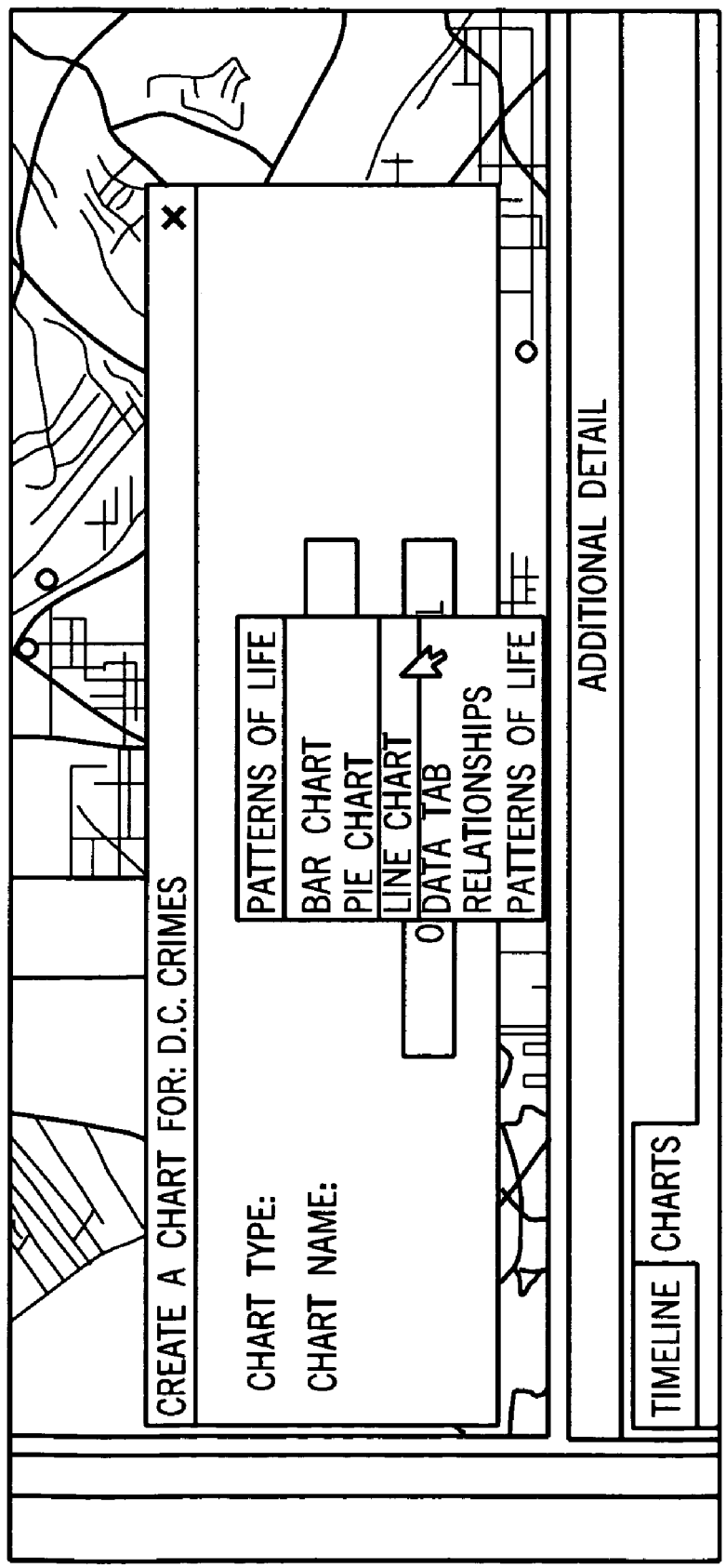
FIG. 3 illustrates one exemplary embodiment of a chart that is created from a data source according to the present method and apparatus.

FIG. 3 illustrates one exemplary embodiment of a chart that is created from a data source according to the present method and apparatus.

Lightweight visual components appear to be small movable windows that are implemented as HTML divs on the page. When the user manipulates these "windows" the underlying JavaScript is actually manipulating and resizing the div so that appears to be a real window. These are in fact implemented completely in JavaScript using DOM programming. These visualizations may be created and removed by the user after the application has loaded. The window may also be minimized to regain space in the main window. Even in this minimized state, the visualization can relay the information it contains to the user, as the minimized versions retain the linked highlighting ability, such that the user can select items in another visualization and observe the results in these "iconified" charts.

Figure 4:
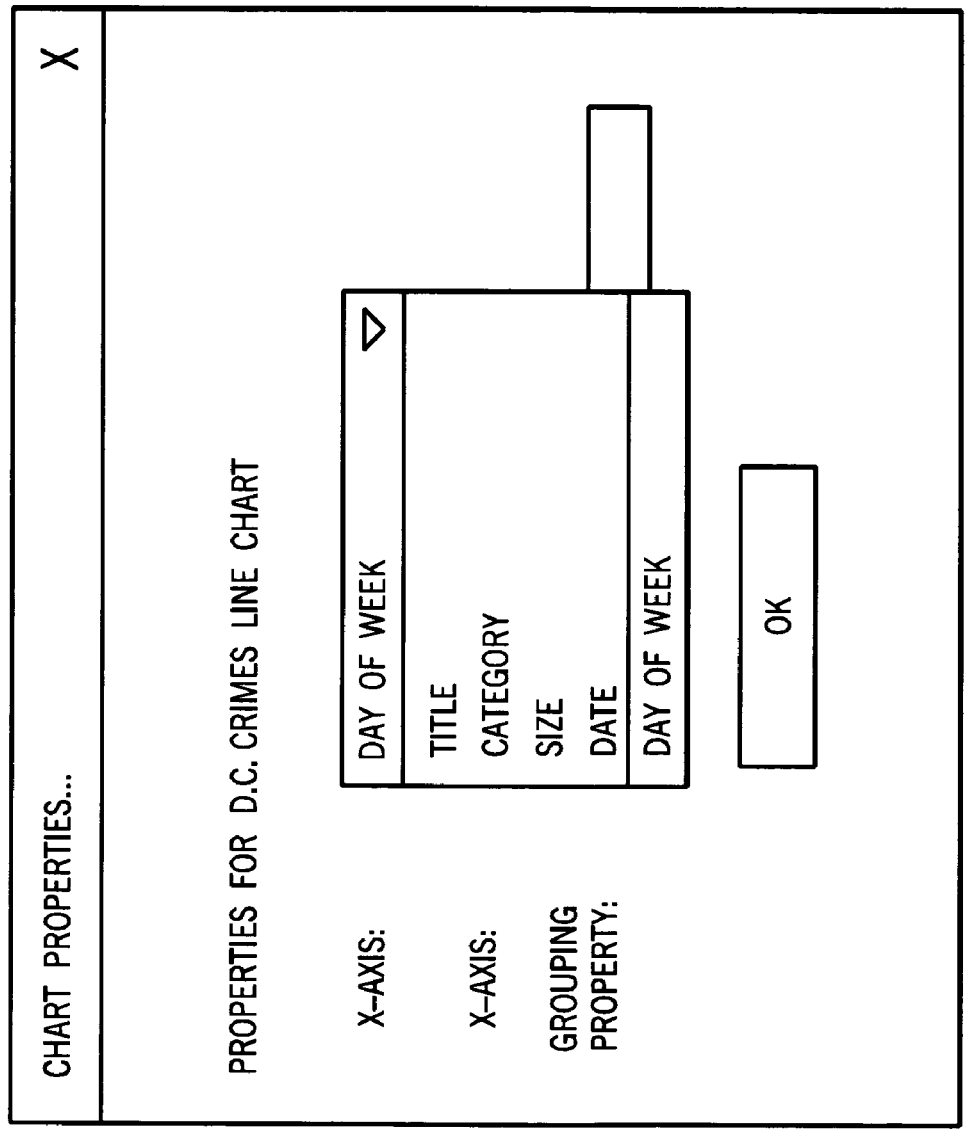
FIG. 4 illustrates one exemplary embodiment in which movable visualizations are modifiable according to the present method and apparatus.

FIG. 4 illustrates one exemplary embodiment in which movable visualizations are modifiable according to the present method and apparatus.

Users can create a movable visualization from any data source in the application, and, with the exception of the map and the timeline, any visualization supported by the thinc™ library can be made into one of these windowed charts, as shown in FIG. 3. Once created, as seen in FIG. 4, the user can modify properties of the chart on the fly, interchanging data fields used for the different axes. Changes made to these fields update immediately, letting the user decide if the changes made are sufficient.

When the minimization button is clicked in an operating system, the current visualization is removed from the main working space of the screen, and displayed in another format, usually in such a way as to convey that the information is still available, and to display changes to the user when the data or selection state changes. Given the limited resources available in a JavaScript environment, the present implementation accomplishes this by removing the visualization from view and resizing the chart to a size that, while too small to allow the user to select or highlight the data therein, still permits the user to see when sections are highlighted or selected by their actions in other visualizations as in FIG. 5.

Figure 5:
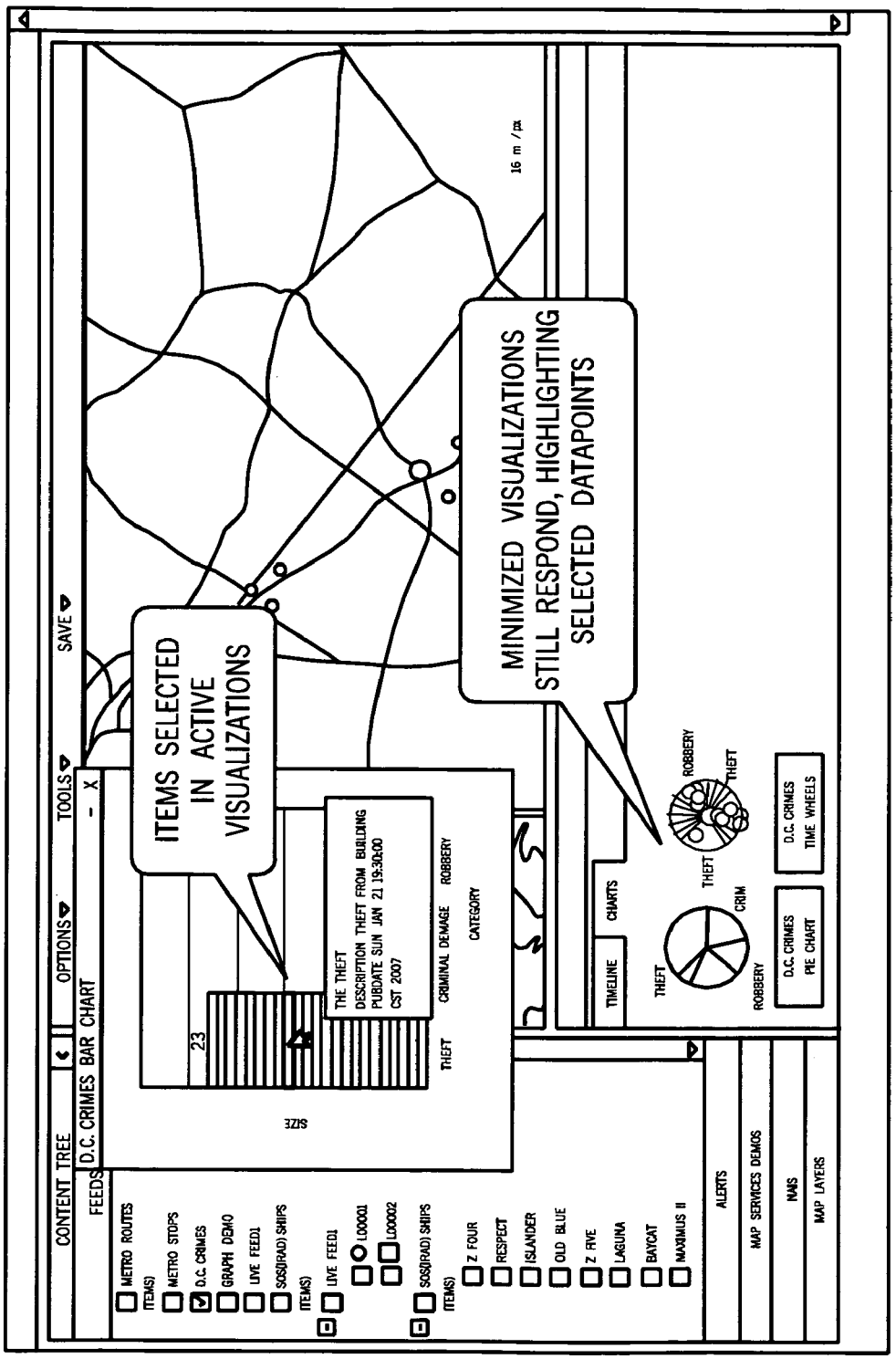
FIG. 5 illustrates another exemplary embodiment of linked visualizations feature of the present method and apparatus.

FIG. 5 illustrates another exemplary embodiment of linked visualizations feature of the present method and apparatus.

By placing an invisible div directly over the chart, it is possible to continue to use all of the functionality inherent to the given chart, while at the same time limiting the actions that a user can have on it. Instead, a click anywhere on the chart will result in the chart returning to its normal size and position on the screen, allowing the user to continue to make full use of it.

Loss of granularity clearly occurs during this minimization process, as most of the visualizations were clearly not intended to be displayed at this size. Nevertheless, in instances where the user wishes to have a large number of charts being displayed at a given time, this ability demonstrates the connections between the given data.

Figure 6:
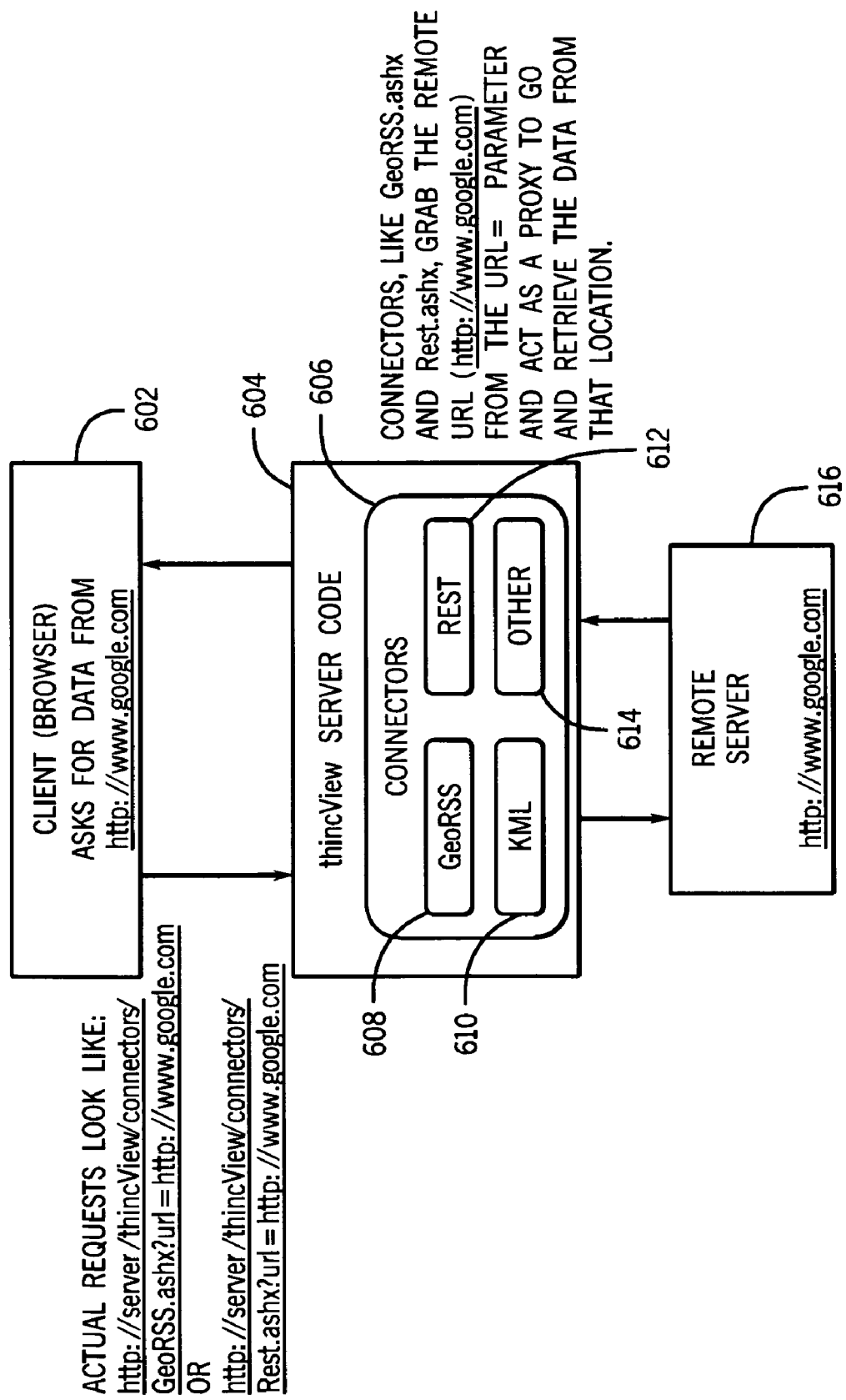
FIG. 6 illustrates one exemplary embodiment of a proxy to remote data according to the present method and apparatus.

FIG. 6 illustrates one exemplary embodiment of a proxy to remote data according to the present method and apparatus.

In this embodiment a client (browser) 602 is operatively coupled to thincVIew server code 604. The thincVIew server code 604 may have connectors 606 which may consist of GeoRSS 608, REST 612, KML 610, and other routines 614. The thincVIew server code 604 may also be operatively coupled to a remote server 616.

The thincVIew makes extensive use of proxies to overcome JavaScript cross-site scripting limitations. The application must proxy, for example, each RSS feed URL since the website cannot access these URLs directly. In addition, the proxy architecture allows for a layer of abstraction between the remote data source and the GeoRSS feed objects in the application. It is possible to ingest feeds that are not in GeoRSS format by simply coding a new proxy that is able to parse the desired format. Through a configuration property, the feed can be routed through the correct proxy so that GeoRSS data is returned to the application, even if the remote data is in another format like KML, GPX, etc.

Figure 7:
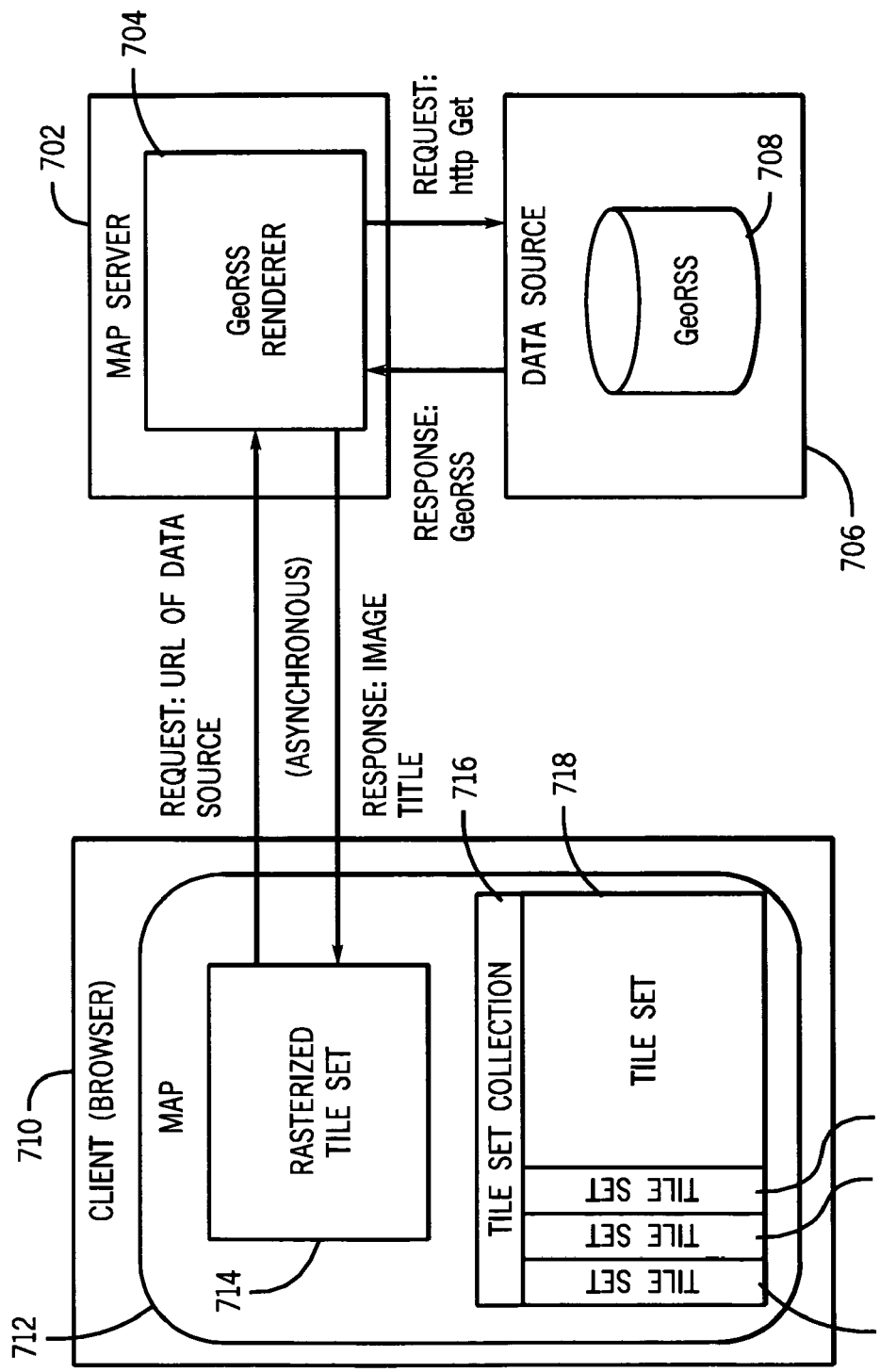
FIG. 7 illustrates one exemplary embodiment of a map server GeoRSS rasterization according to the present method and apparatus.

FIG. 7 illustrates one exemplary embodiment of a map server GeoRSS rasterization according to the present method and apparatus.

The FIG. 7 block diagram is a general view of the MapServer GeoRSS Rasterization. In this embodiment a map server 702 is operatively coupled to a client (browser) 710. The server 702 may have a GeoRSS Renderer 704 that is operatively coupled to in a data source 706 that may have GeoRSS data 708. The GeoRSS Renderer 704 in the map server 702 communicates with a map routine 712 that may have a rasterized tile set 714 and tile set collection 716. The tile set collection 716 may have tile sets 718, 720, 722, and 724.

Certain feature data like roads or boundaries are better pulled into the application as raster imagery rather than as vector data because of the data's complexity and lack of mouse interaction needed for the specific data. Some data feeds might also contain thousands of points or polygons, which overwhelm the JavaScript processing of the web browser. To support these situations, thincVIew exposes an option that lets the user pull in a feed as "rasterized" map tiles instead of as raw GeoRSS feature data. This option leverages server code that effectively converts GeoRSS data into .png image tiles and sends the image back to the application. However, the rasterized data is not tooltipable or linkable. To partially overcome this problem, the code optionally request the last one to two hundred items as GeoRSS, which are displayed on top of the rasterized information.

Figure 8:
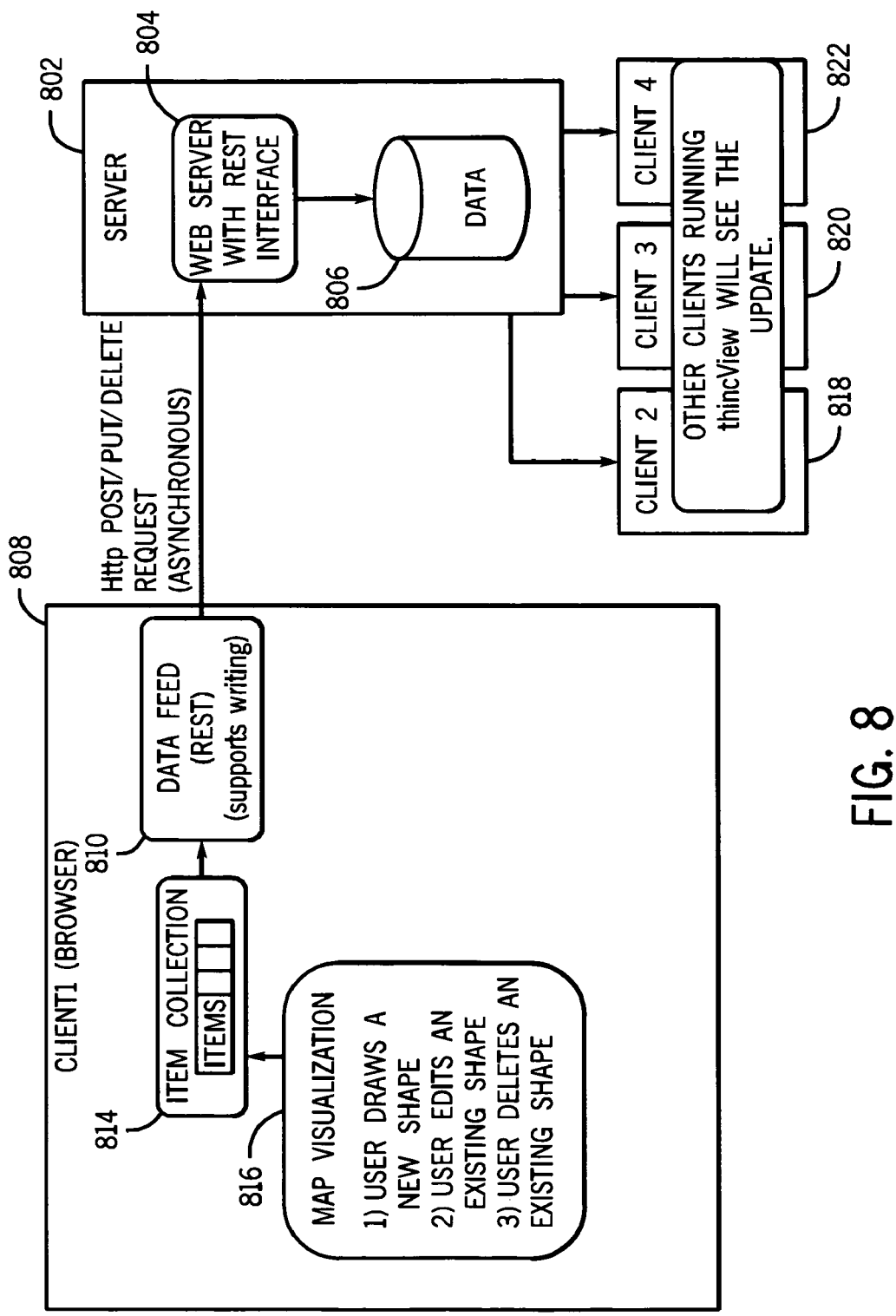
FIG. 8 illustrates one exemplary embodiment of a write capability using REST according to the present method and apparatus.

FIG. 8 illustrates one exemplary embodiment of a write capability using REST according to the present method and apparatus.

The FIG. 8 block diagram is a general view of the write capability using REST. In this embodiment a server 802 is operatively coupled to a client (browser) 808. The server 802 may have a web server with REST interface 804 that is operatively coupled to data in a database 806. The web server 804 in the server 802 communicates with a data feed (REST) 810, which supports writing) via asynchronous HTTP Post/Put/Delete requests. The data feed 810 is operatively coupled to an Item Collection 814 which has items 812 and which is operatively coupled to a map visualization 816. Other clients 818, 820 and 822 may be operatively coupled to the server 802.

In most cases, a feed is simply a read-only list of published items. However, in certain scenarios there is need to not only consume the list of items in the feed, but also create new items, edit existing items, and delete existing items in the data feed. To solve this problem, we have architected a REST solution in thincVIew similar to Google's GDATA specification that leverages HTTP messages to send create, retrieve, update, and delete requests back to the source of the data feed. Letting users make changes to a GeoRSS feed, and displaying those changes to all other users viewing the feed, enables geospatial collaboration in a simple web browser without the need to download any heavyweight software package. Marking areas of interest, annotating boundary areas, drawing geo-fenced alert zones, and more are all possible by simply enabling read and write support for a GeoRSS feed.

Figure 9:
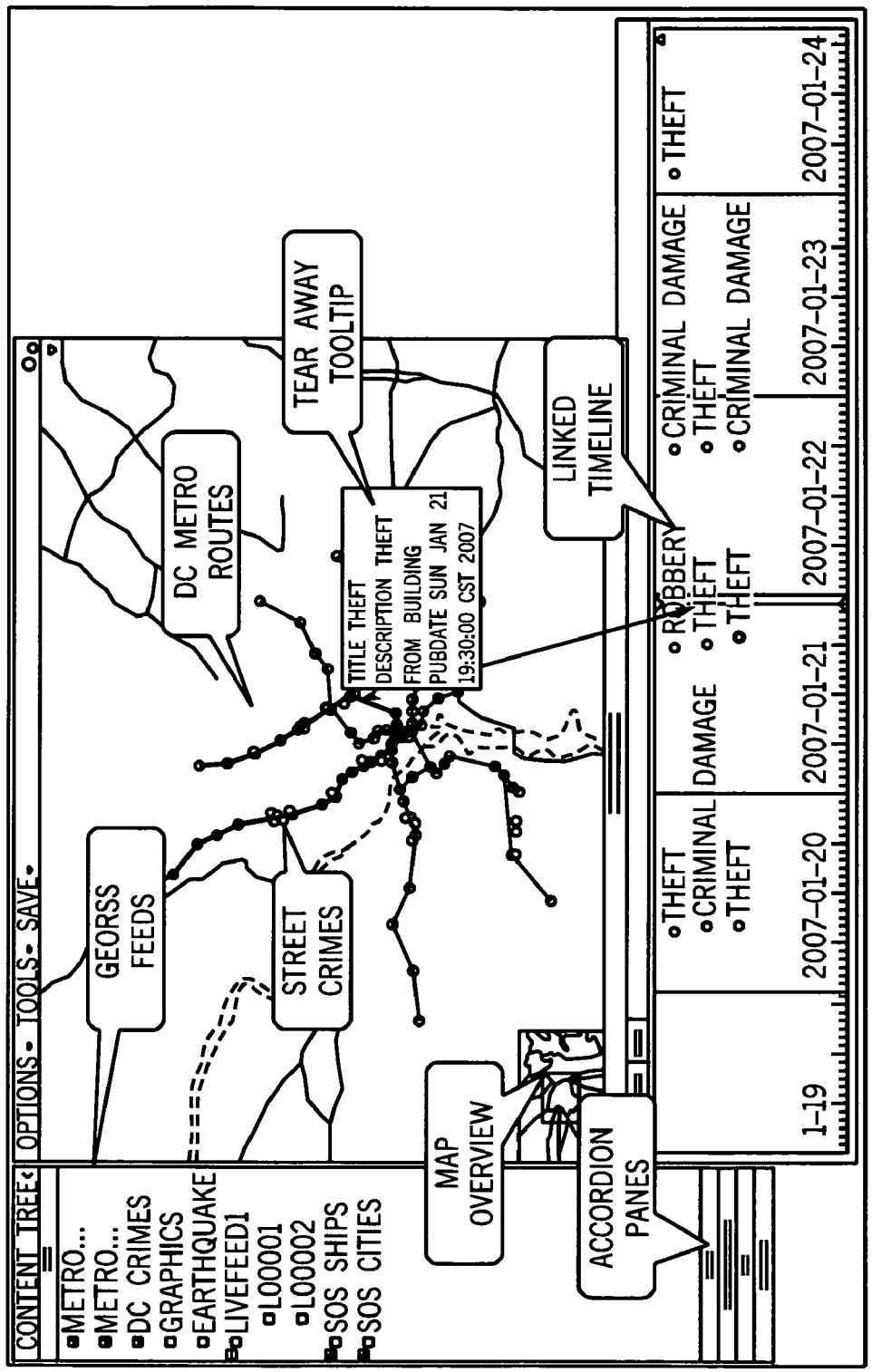
FIG. 9 illustrates one exemplary embodiment of an analytical web application according to the present method and apparatus.

FIG. 9 illustrates one exemplary embodiment of an analytical web application according to the present method and apparatus.

An embodiment of the present method and apparatus, thincVIew, is a thin client analytical web application that includes a lightweight map, interactive timelines, and linked analysis components. In contrast to existing thin client mapping applications, thincVIew is an analytic application. It provides a rich interactive environment for analyzing time-based geospatial feature data. As shown in FIG. 9, thincVIew ingests RSS and GeoRSS streams and creates an interactive mashup. Each GeoRSS item is displayed on the map and in the timeline. RSS items without a geospatial element are only displayed in the timeline. The environment provides linking and several correlation tools to help analysts gain insights from the information. By combining the visual components of a map on a single web page an analyst creates an integrated analytical mashup. This approach to analysis is sometimes called Visual Discovery. The advantage of multiple components is that each presents the mashup events using a different visual metaphor, which might be more appropriate to the dataset.

The following is one example of the use of the present method and apparatus to present Washington D.C. Metro System with crime data.

FIG. 9 shows the Washington D.C. Metro System with the locations of street crimes. The street crimes are both time and location-stamped to when and where the crime occurred and appear both on the map and in the timeline. The map imagery is provided from an OGC Web Mapping Server (WMS). WMS is a standard interface for clients to request rasterized image and map tiles. The image shows when the crimes occurred, where they were, and how they correlate to metro stops and the metro line.

The thincVIew map and timelines are interactive. The user may grab the map or timeline with the mouse and drag it around. As this occurs, the map and timeline pan and zoom smoothly. The way this works is as the map is panned the JavaScript asynchronously requests new image tiles. When the user zooms in, the map animates between zoom levels using five discrete steps. These trips make the interface feel smooth to the users. This style of user interface is sometimes called a Direct Manipulation.

FIG. 10 illustrates one exemplary embodiment of a GeoRSS item for which properties are set for a default drawing style according to the present method and apparatus.

GeoRSS is a flexible way to ingest geospatial feature data. In FIG. 10 the metro system routes, subway stops, and street crimes are each pulled from separate GeoRSS feeds. The feed for the metro lines consists of a static sequence of line segments with color codes. Similarly the feed for the metro stop is also a static list of geopositions represented as items in the GeoRSS feed. However, the street crime feed is a list of items each of which represents a crime with a location to specify where the crime occurred. To specify the location within the GeoRSS specification there is a namespace extension <georss:where> node where arbitrary shapes may be specified using GML. For example, FIG. 10 shows the GeoRSS item describing the Orange Line. The physical location of the of the Line is specified using a <gml:LineString> as a sequence of latitudes and longitudes.

Within the GeoRSS specification there is no capability to define drawing styles, e.g. colors and line thicknesses, for the metro routes. To address that need the present embodiment extends GeoRSS using a namespace extension to add styling properties and certain shapes that are needed for the application. The shapes added are ellipses, sectors, and slices of a circle. Although these shapes could be represented in GeoRSS using a GML generic polygon, it is rather cumbersome. To avoid any namespace clashes, all extensions are put into the thincml namespace. For example, the specification:

<georss:where>
<thincml:sector center="3 8.82, −77.12" radius="4000" insideradius="3000" startangle="90" arcangle="45"/>
</georss:where> represents a sector of a circle or a pie wedge if the inside radius is zero.

FIG. 10 illustrates one exemplary embodiment of GeoRSS feeds ingested in the FIG. 9 embodiment according to the present method and apparatus.

Figure 12:
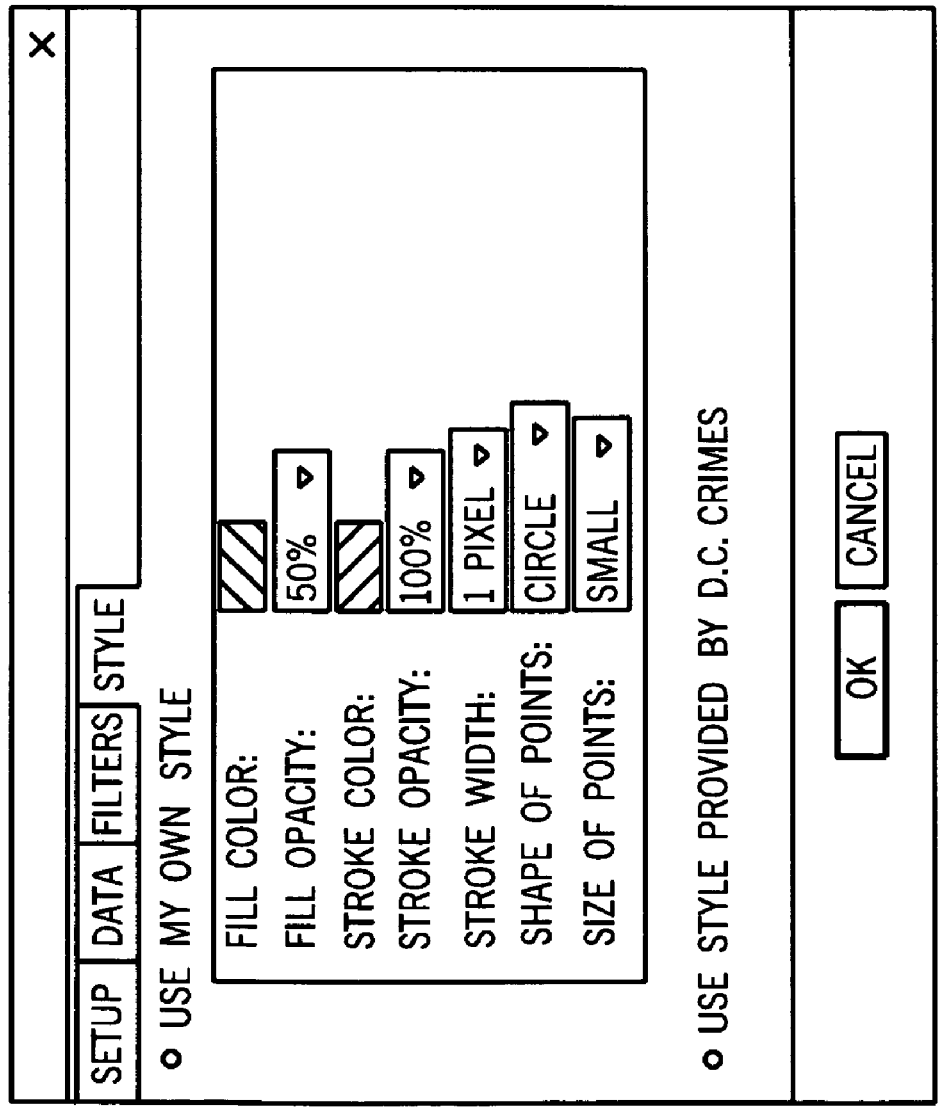
FIG. 12 illustrates one exemplary embodiment in which analysts may override the styling of items in the feed according to the present method and apparatus.

FIG. 12 illustrates one exemplary embodiment in which analysts may override the styling of items in the feed according to the present method and apparatus.

The thincVIew web application has the capability to ingest an arbitrary number of GeoRSS streams. See FIG. 11. The stream may represent static information such as the locations of the Washington D.C. metro routes or dynamic information such as recent earthquake locations. For dynamic feeds thincVIew monitors each data stream and periodically polls it to access the latest information.

Each item in a GeoRSS feed is drawn on the map in the appropriate geospatial position. By default, the items are rendered on the map using styling properties specified in the thincml. However, users may override the default rendering styles as shown in FIG. 12. Using these overrides, analysts are able to analyze data streams for specific patterns in the data set.

Figure 13:
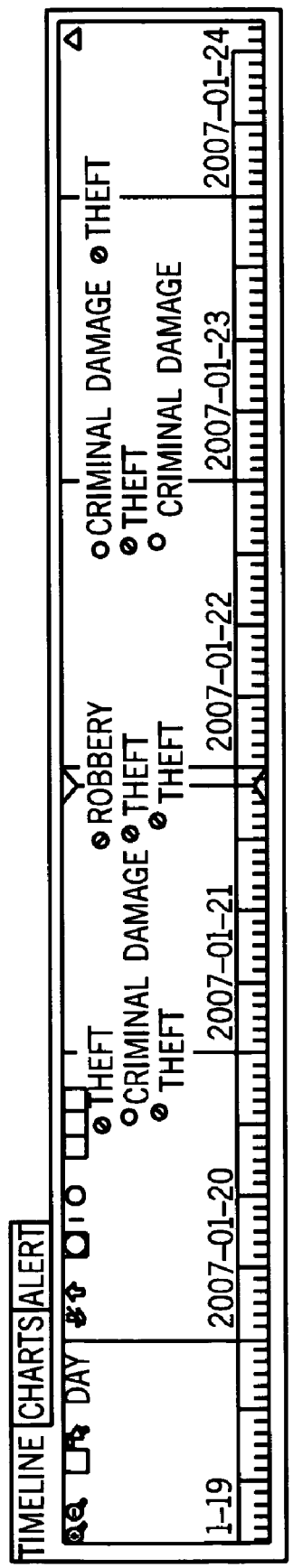
FIG. 13 illustrates one exemplary embodiment of a dynamic time line that displays RSS items and that is linked to a map and other visualizations, and that automatically pans when new items become available.

FIG. 13 illustrates one exemplary embodiment of a dynamic time line that displays RSS items and that is linked to a map and other visualizations, and that automatically pans when new items become available.

As shown in FIG. 13, the thincVIew Timeline™ is a lightweight web component for visualizing and interacting with time stamped data. GeoRSS items that appear on the map and RSS items in the feed are automatically positioned on the timeline. The Timeline includes a number of innovative features such as: interactive panning and interactive zooming, detailed timeline that is synchronized with an overview timeline, panning to most recent events in watch mode, multiple time scales such as hour, day, week, and month, built in RSS support, linking to other visualizations, multiple data display modes, ability to select specific data items, ability to highlight specific data items, rich API to program against, built in Toolbar, visual scalability over plotting indicator, best fit algorithms to position labels to avoid over plotting, algorithms to fit all points on the display, height plotting to encode information using the y-position, The Timeline visualization itself can be thought of as a series of rectangular tiles that each represent one unit of time and are placed horizontally to fill up a specified number of pixels on the web page. The unit of time represented depends on the scale of the timeline, which can be set to Year, Month, Day, Hour, Minute, or Second.

The thincView Timelines are interactive. As the user drags a Timeline to the left or right using the mouse, new tiles are created and destroyed to give them the impression they are "panning" through time. This style of interaction is intuitive and easy to understand for users. In addition, simple buttons on the toolbar allow the user to zoom the timeline in or out, change the current timeline scale, pan to the most recent event, and reset the timeline scales.

Figure 14:
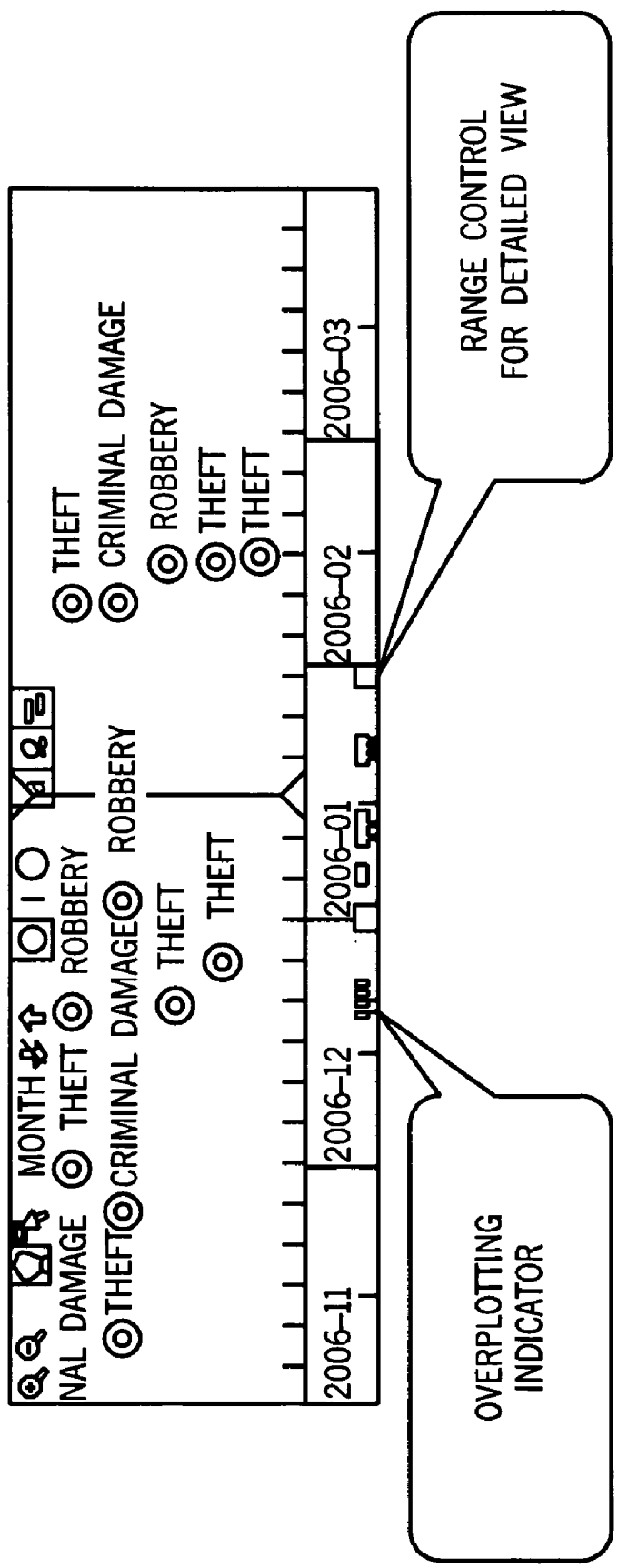
FIG. 14 illustrates one exemplary embodiment of an overview and detail time lines that are synchronized to show multiple time scales, and that (1) automatically pans as new items become available, or (2) automatically pans to reflect the current time.

FIG. 14 illustrates one exemplary embodiment of an overview and detail time lines that are synchronized to show multiple time scales according to the present method and apparatus.

FIG. 14 shows synchronized overview and detail thincVIew Timelines. The overview Timeline is set to Month scale and the detailed Timeline is also set to Month scale. Each tile is labeled with its starting date and end date. Small vertical dashes are placed intelligently on the tile to indicate familiar time intervals and subintervals. For instance, day tiles would show each hour of the day as the smaller subinterval marks and the larger tick marks are used to divide the day into quarters. The tiles are automatically generated and labeled using configurable settings for background color and date format. The advantage of using two (or more) Timelines is the fact they can be synchronized together. As the user manipulates one of the Timelines, the other Timeline scrolls accordingly. The blue lens in the center of the bottom Timeline represents the entire time period displayed in the top Timeline. This capability is desirable when attempting to display a summary level and detailed view of the same data.

The rendering and interaction code on the thincVIew timeline is sometimes tricky. For rendering, the simplest approach is to plot objects corresponding to the data items on the timeline canvas. This approach could support basic interactive operations like tooltips, selecting and highlighting individual items or toggling an item's visibility. However, implementing more advanced features such as hiding a group of items become computationally expensive in JavaScript. A second disadvantage of this approach is that it does not gracefully extend to display data from multiple data feeds described by many RSS feeds.

To overcome these problems the implementation renders each timeline event feed in its own separate transparent overlay on top of the raw timeline canvas. Each overlay is independently populated using different event feeds and various properties, e.g. text labeling, display symbol, etc., of the overlays may be adjusted. The advantage of this approach is that it is trivial to efficiently add or remove a feed from the Timeline or to configure properties of a feed, such as toggling its visibility, because the feed corresponds to a single overlay on the Timeline, which can easily be manipulated.

Figure 15:
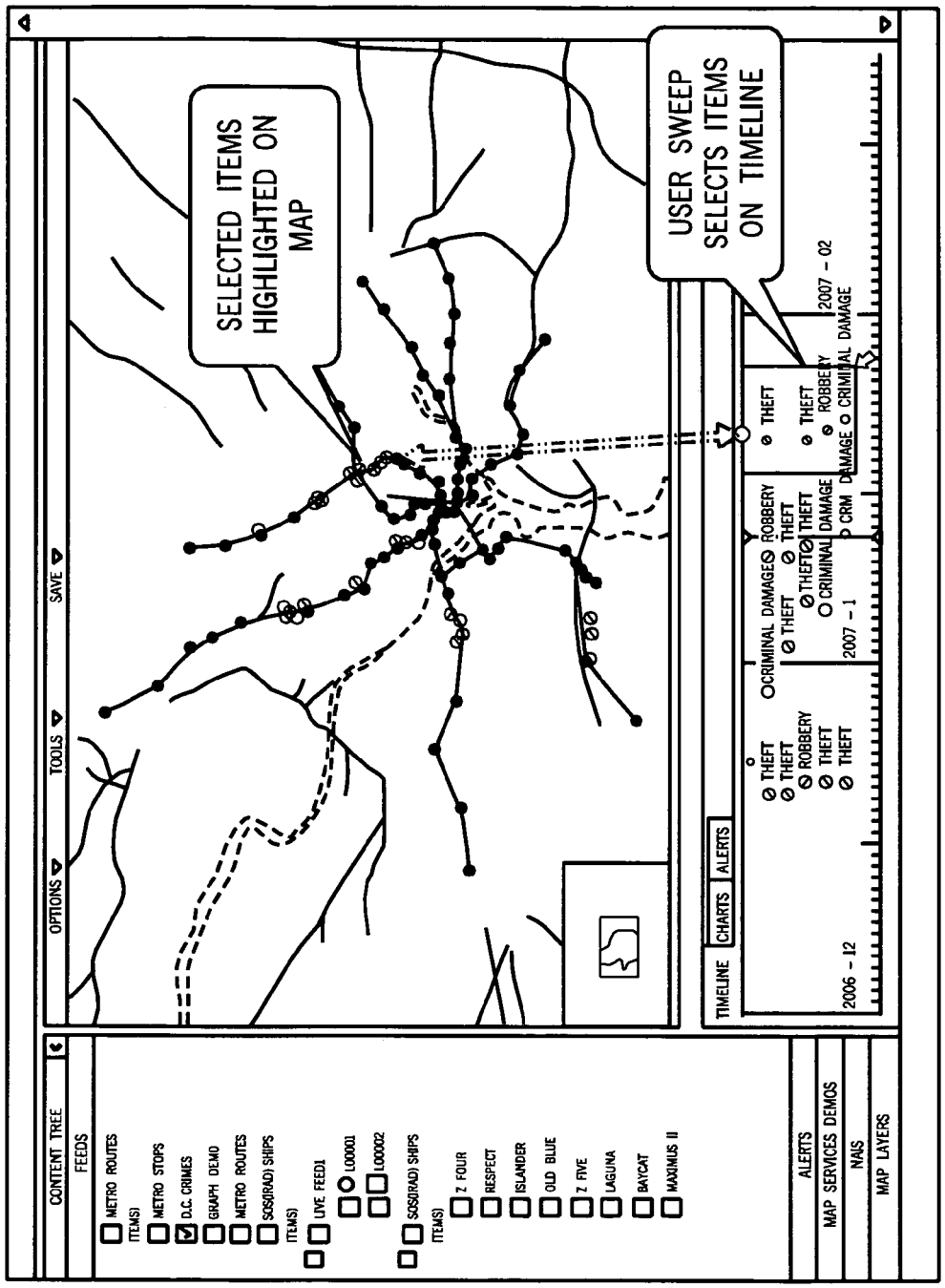
FIG. 15 illustrates one exemplary embodiment wherein is shown the feature of a sweep selecting a time range high lighting locations of items on a map according to the present method and apparatus.

FIG. 15 illustrates one exemplary embodiment wherein is shown the feature of a sweep selecting a time range high lighting locations of items on a map according to the present method and apparatus.

Sometimes a user wants to know when a closely related set of geospatial events occurred or where a set of temporally related events occurred. To help answer these questions, data items on the thincVIew Map and Timeline are linked to enable analysts correlate between the temporal and spatial representations and spot relationships. Data items are linked in three ways. First, when the user holds the mouse over a data point on the timeline, the corresponding data point on the map is highlighted. The user is able to peer into the dataset, exploring relationships and searching for patterns that might be hidden.

Second, as is also shown in FIG. 15, the user is able to select groups of items. In this mode the user sweeps out a region and selects a set of items. Instantly, these items are highlighted on both the timeline and map displays. In FIG. 15, the user is in the process of selecting a group of items on the Timeline, which will also tell "where" these events occurred by watching the Map display change as the linked items are selected. Sweep selecting on the map tells the user "when" the events occurred by observing the changes in the Timline. In the example the sequence of selected crimes the occurred over a several hour period all took place along the red line. More importantly, however, this operation causes the selected data items on the thincVIew Map and Timeline instantly to be highlighted as shown by the white outlines, and thereby helps the user visualize the "where" and "when" about the object's events. Each thincVIew visualization component offers a user a different way to visualize the data items. Linking unifies the data across the visualizations and allows the analysts to construct a mental model of the events in both time and space.

Third, the user also is able to change the glyphs and icons on the display. In this scenario, showing crime patterns, the crimes are displayed as simple color-coded circles with color indicating the crime type. The user could, for example, go into the properties of the data feed, and change the styling so that "robbery" crimes display as yellow triangles, and "violent crimes" to appear as purple squares. In this way, the user is able to stratify the visualization, searching for latent patterns.

Figure 16:
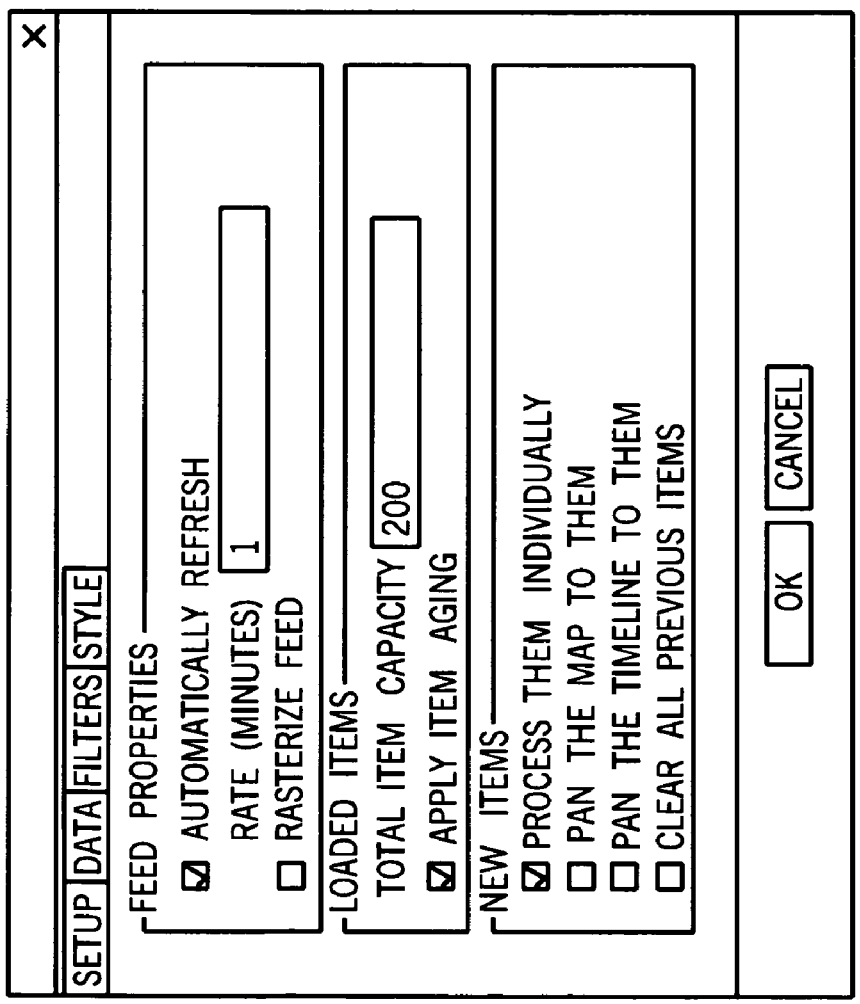
FIG. 16 illustrates one exemplary embodiment showing options for data feeds to set polling rates and item fade out period according to the present method and apparatus.

FIG. 16 illustrates one exemplary embodiment showing options for data feeds to set polling rates and item fade out period according to the present method and apparatus.

In monitoring mode the thincVIew constantly polls for the new events and renders these events on the map and timeline. Eventually the map becomes cluttered with too many items and too much information. For situational awareness applications, old information is often not relevant to the current state and is distracting. To help minimize visual clutter thincVIew has several options involving event fadeout. These include: Polling frequency which determines the frequency that the RSS provider is accessed to request new items, Fade Out period which cause items on the map and timeline to gradually fade and disappear to avoid cluttering the display with stale information, and pan to latest item causes either the map, timeline or both to pan to any new events as they arrive.

Figure 17:
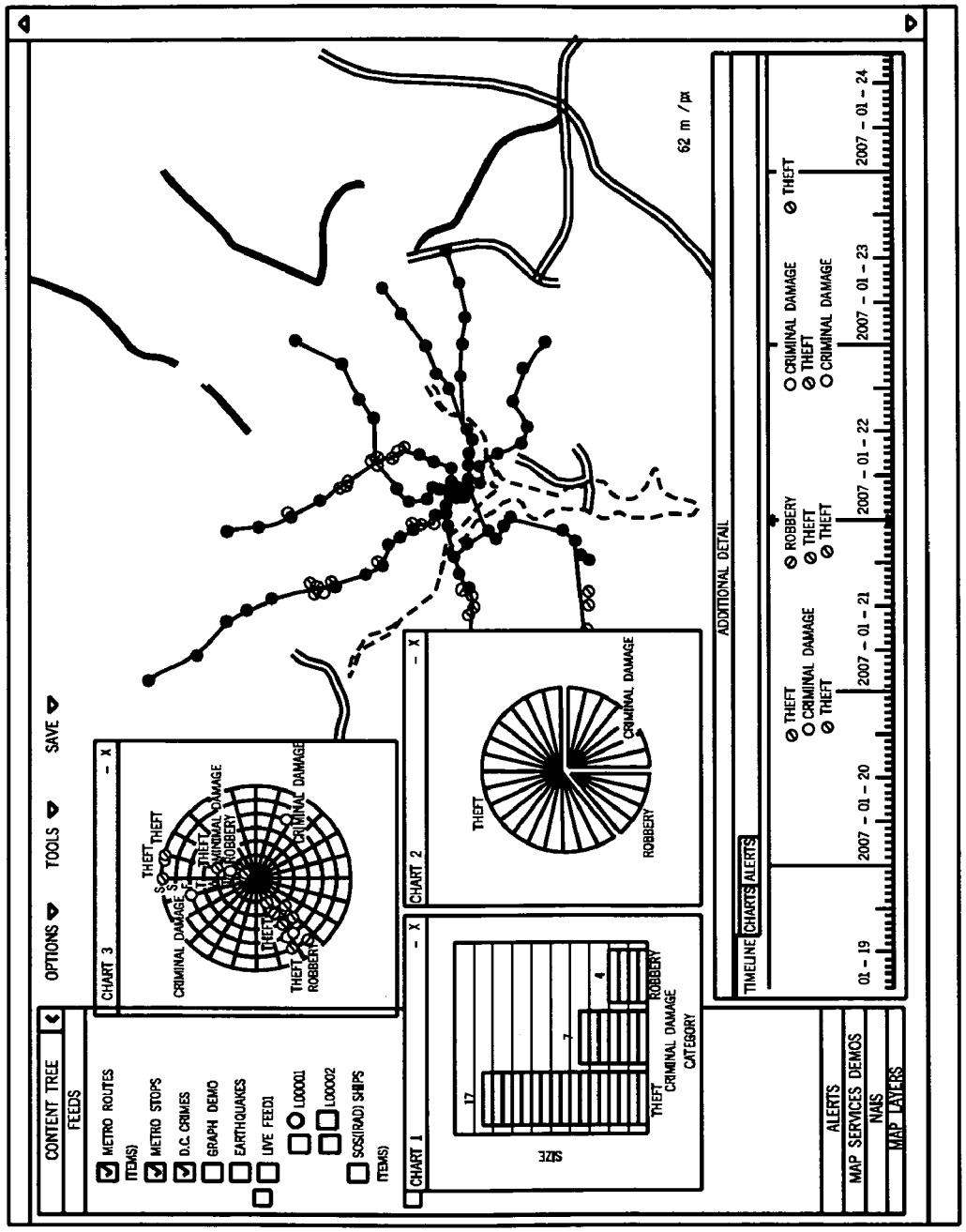
FIG. 17 illustrates one exemplary embodiment showing analysts using linked visual metaphors running in a browser according to the present method and apparatus.

FIG. 17 illustrates one exemplary embodiment showing analysts using linked visual metaphors running in a browser according to the present method and apparatus.

Viewing data on a thincVIew Map and Timeline is helpful, but is limited in that it is only possible to spot certain types of patterns and outliers in the data. What is missing is a capability to correlate spatial and non-spatial dimensions. To overcome this limitation, thincVIew lets the analyst create linked sets of visual components. Each visual component shows the data items using its own visual metaphor. The items in each visual metaphor are linked so that tooltips and selections propagate among the visual metaphors.

Visualizing the data in multiple charts on the same page improves the ability to see different aspects of the data. To illustrate this capability FIG. 17 shows the DC crime data using a time wheel, bar, and pie visual metaphor. The time wheel, sometimes called "patterns of life", is a 24-hour clock with the day of week shown as concentric circles starting with Sunday. The bar and pie charts show the crime dataset summarized by crime type. Individual crimes are shown on the map, in the timeline, and in each of the linked visual metaphors.

The thincVIew's selection and linking capability help users identify patterns in the data, which are difficult to see without these charts. For example, the bar chart shows that the number of thefts is about 2.5 greater than the number of criminal damage complaints, which is approximately 50% larger than the number robberies. Selecting the crimes on the time wheel, which occurred late at night, and correlating these items with their locations on the map shows that most of these crimes occurred along the red line. Noticing these events in the time line shows that that occurred on a sequence of three days. Furthermore, there appear to be two distinct patterns of events on the time wheel. These are a sequence of crimes in the early evening and another sequence in the late evening and early morning. There is one exception. One criminal damage incident occurred in the early morning as indicated by the single green circle.

Figure 18:
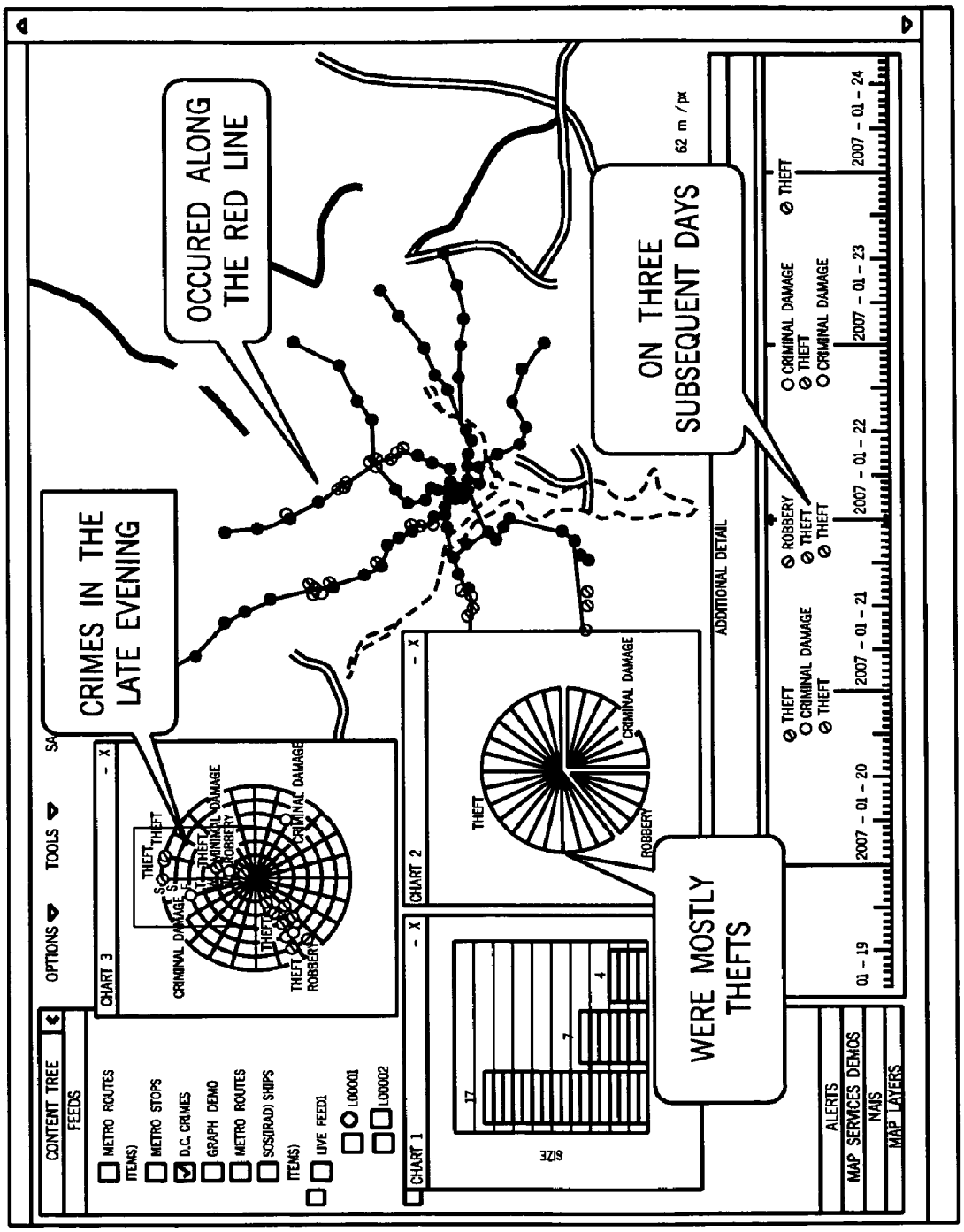
FIG. 18 illustrates one exemplary embodiment showing how selections and tooltips propagate among the linked visual components, map, and timeline according to the present method and apparatus.

FIG. 18 illustrates one exemplary embodiment showing how selections and tooltips propagate among the linked visual components, map, and timeline according to the present method and apparatus.

Using thincVIew a user is able to ad hoc analysis by dynamically creating linked visualizations. In the example, as shown in FIGS. 17 and 18, the user instantiates analysis components dynamically. These analysis components are resizable and dragable, and can even be minimized into the data tray at the bottom. Being live windows, as new data points are ingested into the system, the visual components will re-render themselves as needed. With this powerful tool, the user is able to construct a mental model for the dataset, and do fine grained analysis of portions of the data as they expand and peer into the data. Since the tools are dynamic, the user is able to filter the data, and then construct graphs from the browser.

The sample dataset is police crimes in Washington D.C. An analyst is able to ingest the "crimes" data, do a simple filter to select the "Robbery" category, and then construct a Time-Wheel display to see when the crimes were reported, to discover if there is a pattern in the time dimension. By displaying the crimes on the map, the analysts are able to see if there is a geographic pattern as well. Since the displays are linked, the user is able to sweep select regions, and see them highlight on the other visualizations. With these linked components, the analysts are able to discern whether a robbery is a single crime of chance, or part of a larger pattern indicating more organization. The analyst is able to quickly stratify the data and look for patterns. While the filtering engine is not the industrial strength query analysis tool that today's database engines provide, the lightweight and ready access to the data enable the user to arrive at conclusions quickly to take action.

The following is another example of the use of the present method and apparatus in the area of a multi-level analysis of retail purchasing patterns.

In general terms an embodiment of the present method and apparatus may have at least one store having a predetermined floor plan layout, and the at least one store having at least one predetermined location on the predetermined floor plan layout for displaying at least one product. An analytical environment for mashup data may have visual analysis metaphors, the mashup data being formed from data indicative of the predetermined floor plan layout of the at least one store, and data indicated of sales of the at least one product. A linking and correlation functionality among the visual analysis metaphors enables interaction and interrogation of the mashup data through a web browser.

Data indicative of the predetermined floor plan layout may be depicted in a geographical display, and data indicated of sales of the at least one product may be depicted in a timeline display.

The geographical display and the timeline are depicted in a common browser, and the analytical environment may have a functionality that allows a zooming in on the geographical display in the common browser for analysis of sales of the product, in relation to the floor plan layout, as depicted in the timeline in the common browser.

The predetermined floor plan layout of the store may further have a plurality of aisles having a plurality of shelves, and a plurality of products may be positioned on the plurality of shelves. Each product on a particular shelf in a particular aisle may be depicted in a geographical display, and sales of each product may be depicted in a timeline display that is linked to the geographical display. The analytical environment may show how much of at least one class of product sells over a period of time in light of a geographical location(s) of the at least one class of product in the store.

It is to be understood that different companies have separately implemented many of the different functions described above. However, no one has been able to combine these different functions into one overall application that allows an analyst to easily determine the effects of the interrelated relationships. Embodiments of the present method and application provides a solution to this problem.

As a further specific instance of the functionality discussed earlier, another example is an application in the retail industry focusing around store clustering and sales pattern analysis. Both of these activities currently involve collecting data from multiple disconnected sources, analyzing historical data, and relying on personal experience to fill in any gaps in the data.

In recent years, more and more retailers are offering customer loyalty programs. These programs have many different variations but they serve two basic roles. The first is to help keep current customers coming back by offering incentives or programs that reward loyalty to the retailer. The second is to provide valuable market research data for the retailer on customer demographics and buying habits. However, as may be obviously apparent, the resulting dataset is enormous with significantly more variables than any person could ever analyze. The thincVIew application provides a set of visualizations that enable the user to interact and interrogate their data quickly and efficiently through a web browser.

Figure 19:
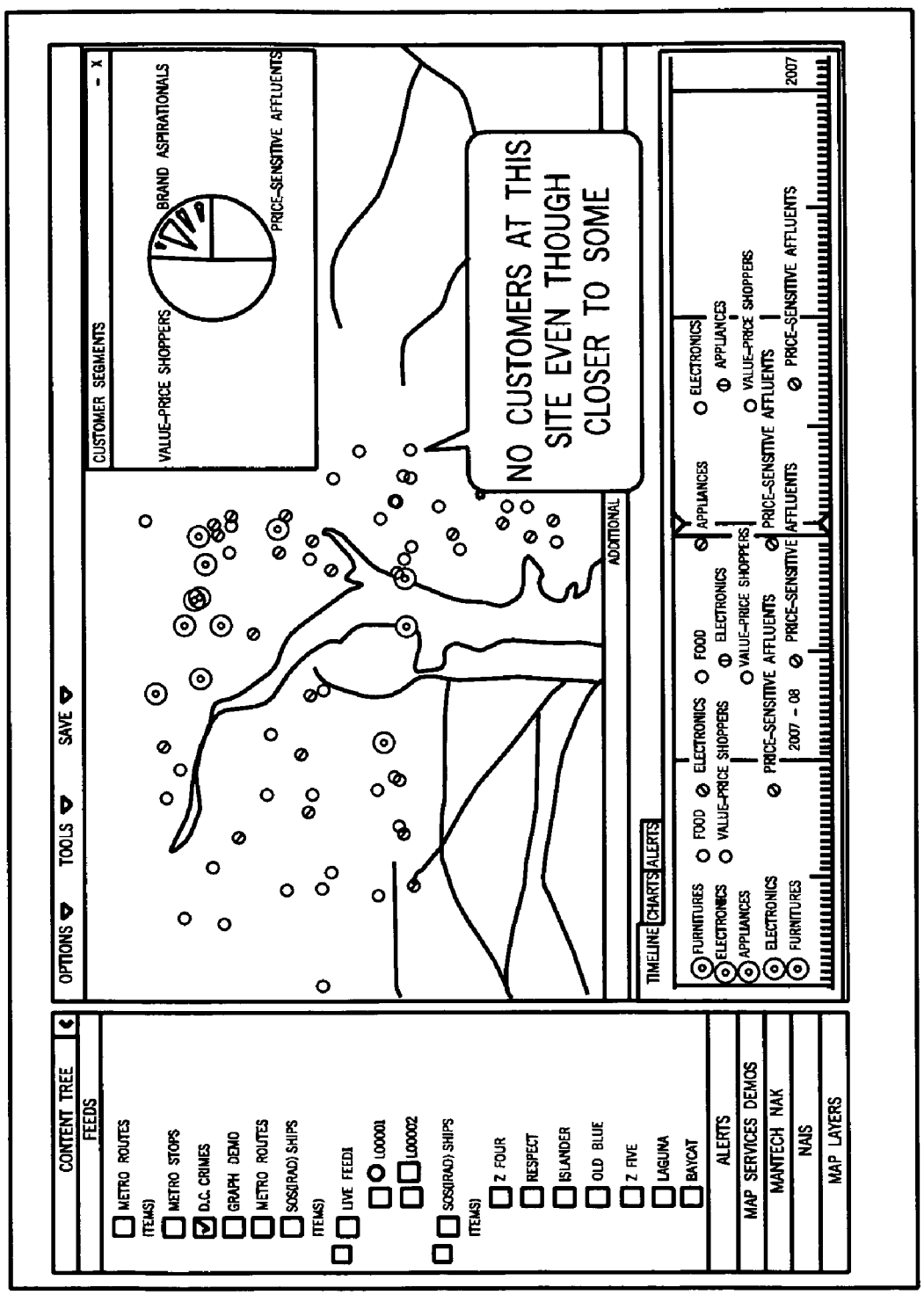
FIG. 19 illustrates one exemplary embodiment of locations of customers color coded by customer segment according to the present method and apparatus.

FIG. 19 illustrates one exemplary embodiment of locations of customers color coded by customer segment according to the present method and apparatus.

Figure 20:
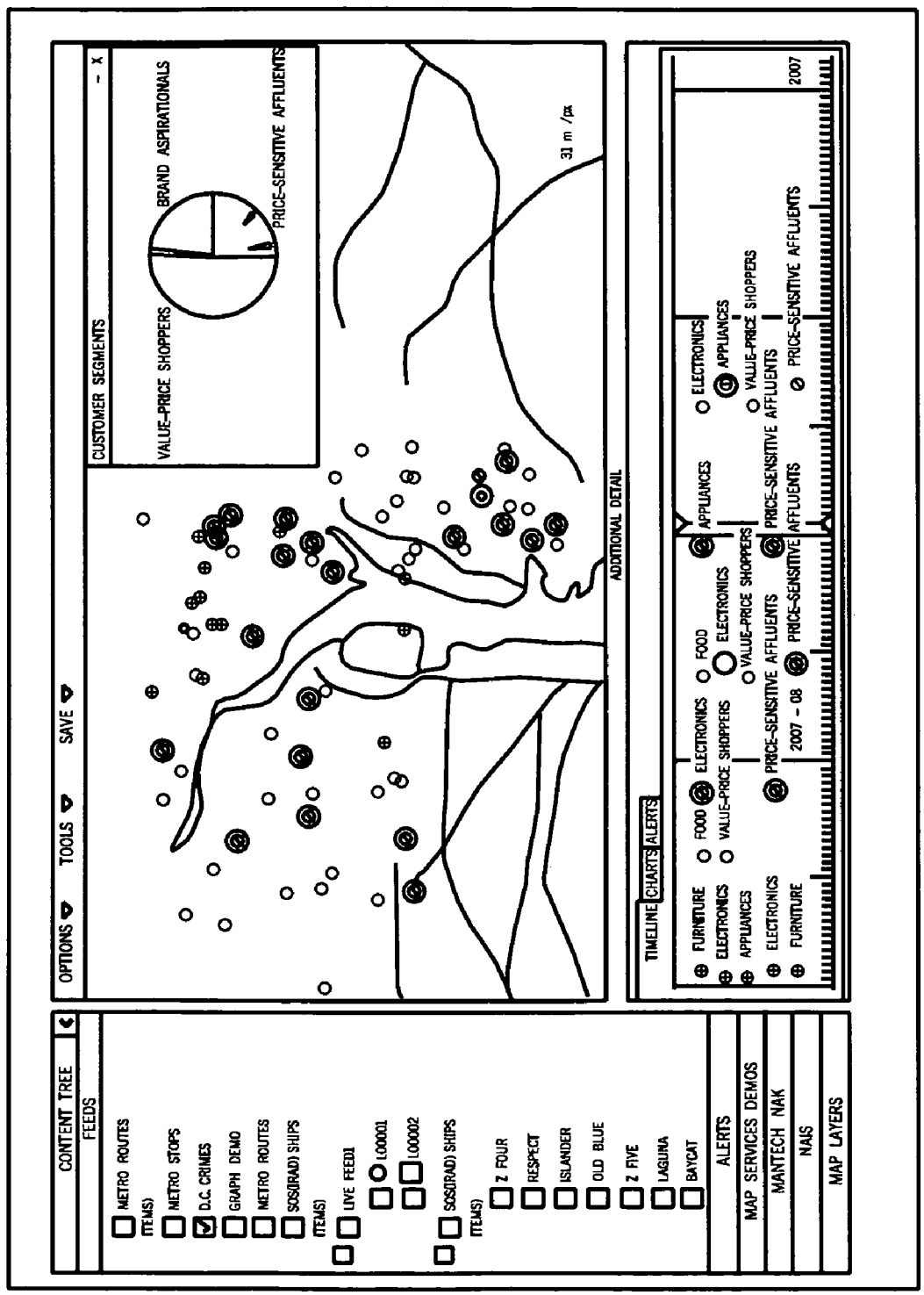
FIG. 20 illustrates another exemplary embodiment of locations of customers color coded by customer segment according to the present method and apparatus.

FIG. 20 illustrates another exemplary embodiment of locations of customers color coded by customer segment according to the present method and apparatus.

In this example, a hypothetical retailer has two stores within the Washington D.C. metro area and a handful of customers who participate regularly in the loyalty program. The customers have been grouped into three unique segments: "brand aspirationals", "value-price shoppers", and "price-sensitive affluents." Instead of writing and processing database queries in a desktop application, thincVIew enables the user to identify an anomaly in the shopping habits of two customer segments, as shown in FIGS. 19 and 20. The analysis problem is to understand the shopping patterns of the different customer segments. There are two stores locations in the image indicated by red circles. Each customer transaction is shown on the timeline and the customer's home address has been geo-encoded and positioned on the map.

Embodiments of the present method and apparatus, unlike the conventional approach related spatially and geo-spatially each customer segment that has a respective shopping pattern. Thus in the above example the three unique segments: "brand aspirationals", "value-price shoppers", and "price-sensitive affluents" are uniquely related spatially and geo-spatially.

The images in FIGS. 19 and 20 show geospatial and temporal shopping patterns of the customer segments. FIG. 19 shows that the "brand aspirationals" prefer to shop at the northern location whereas the "price-sensitive affluents" segment prefers the southern location.

Additionally, beyond seeing the result of the geographical analysis indicating customer preference for a store by customer type and not location, the linked functionality of the visualizations enables the user to also review what specific customers are buying and when they are shopping. Improved data analysis can help drive better store clustering, leading to improved sales per square foot, fewer markdowns, and higher GMROI. Using existing data from other systems such as POS or merchandising, thincVIew presents a visual analysis tool often missing in other retail solution sets. Users can quickly see buying patterns by location or by customer segment.

The thincVIew's unique ability to fuse business data (like customer loyalty information together with map data like store locations or potential sites) creates a powerful analysis tool for retailers. Users are able to quickly identify customer-buying patterns by geography, by customer segment, even by time of day in the same way they would interact with Google maps or other easy-to-use web applications. With this type of information, retailers can take real-estate analysis and selection to a new level by identifying opportunities for new growth or opportunities for consolidation. Additionally, retailers can identify buying patterns within or among key customer segments, which could drive more targeted promotions, better merchandising, improved product mix, or even modified store hours for greater sales per square foot.

Retailers and consumer goods manufacturers have often engaged in various collaborative efforts around VMI (Vendor Managed Inventory), Scan-Based Trading, Slotting fees, etc. Embodiments of the present method and apparatus bridge the gap between planning, execution, and measurement/close loop feedback. For example, retailers (often in grocery) charge CPG manufacturers fees to place their items on specific areas of shelves under the assumption that that area is "prime real estate". The present embodiments enable retailers to conduct analysis to determine such performance and thereby have dynamic slotting fees based on actual shelf-level performance. Secondly, because of the Web 2.0 application, this information may be viewed by suppliers via the web, enabling suppliers to better gauge and manage their own performance at a shelf-level using visual media. This is another unique aspect of the embodiments of the present method and apparatus.

Figure 21:
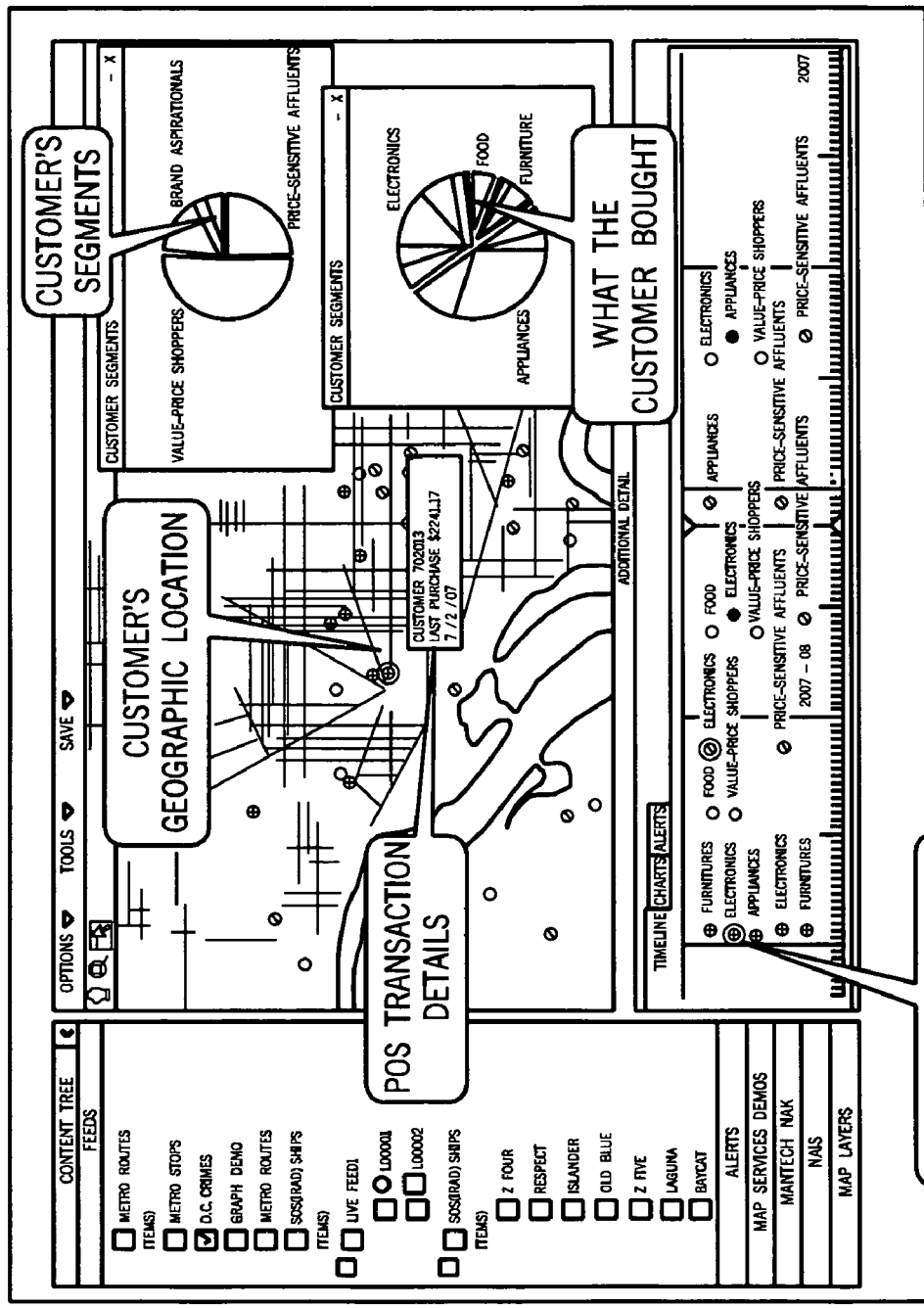
FIG. 21 illustrates one exemplary embodiment depicting correlating customer purchases with customer segments according to the present method and apparatus.

FIG. 21 illustrates one exemplary embodiment depicting correlating customer purchases with customer segments according to the present method and apparatus. FIG. 21 also illustrates how the different visualizations can display these different data sources at the same time.

Combined with existing data from Merchandising or POS systems, this Visual Intelligence tool helps retailers tap into the goldmine, which is their customer data. Designed for retailers of all sizes, this tool takes advantage of Web 2.0 and Service Oriented Architecture (SOA) to provide users with a better view of existing and potential customers.

Figure 22:
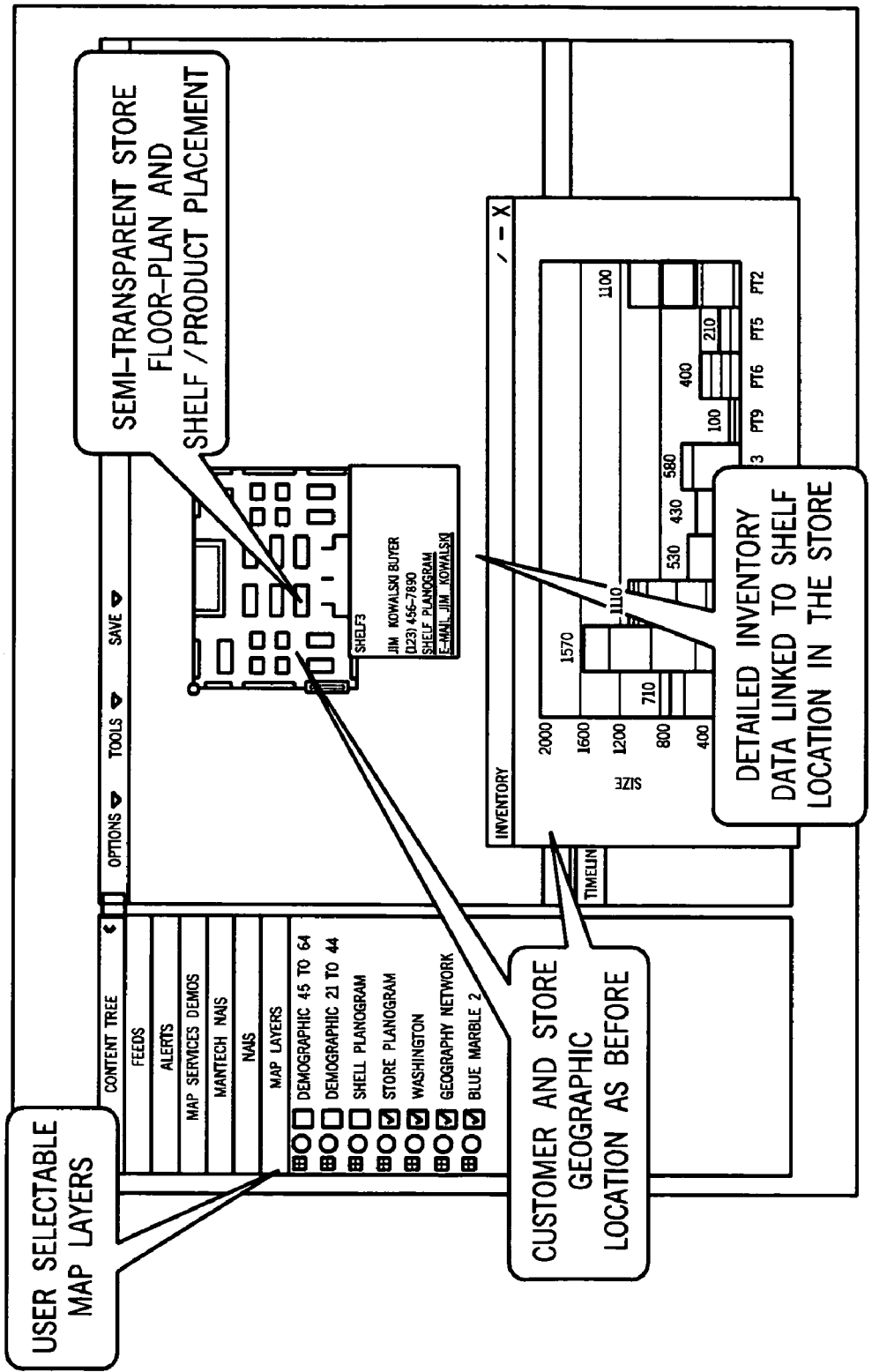
FIG. 22 illustrates one exemplary embodiment depicting sales performance by aisle correlated with product and item category according to the present method and apparatus.

FIG. 22 illustrates one exemplary embodiment depicting sales performance by aisle correlated with product and item category according to the present method and apparatus.

Figure 23:
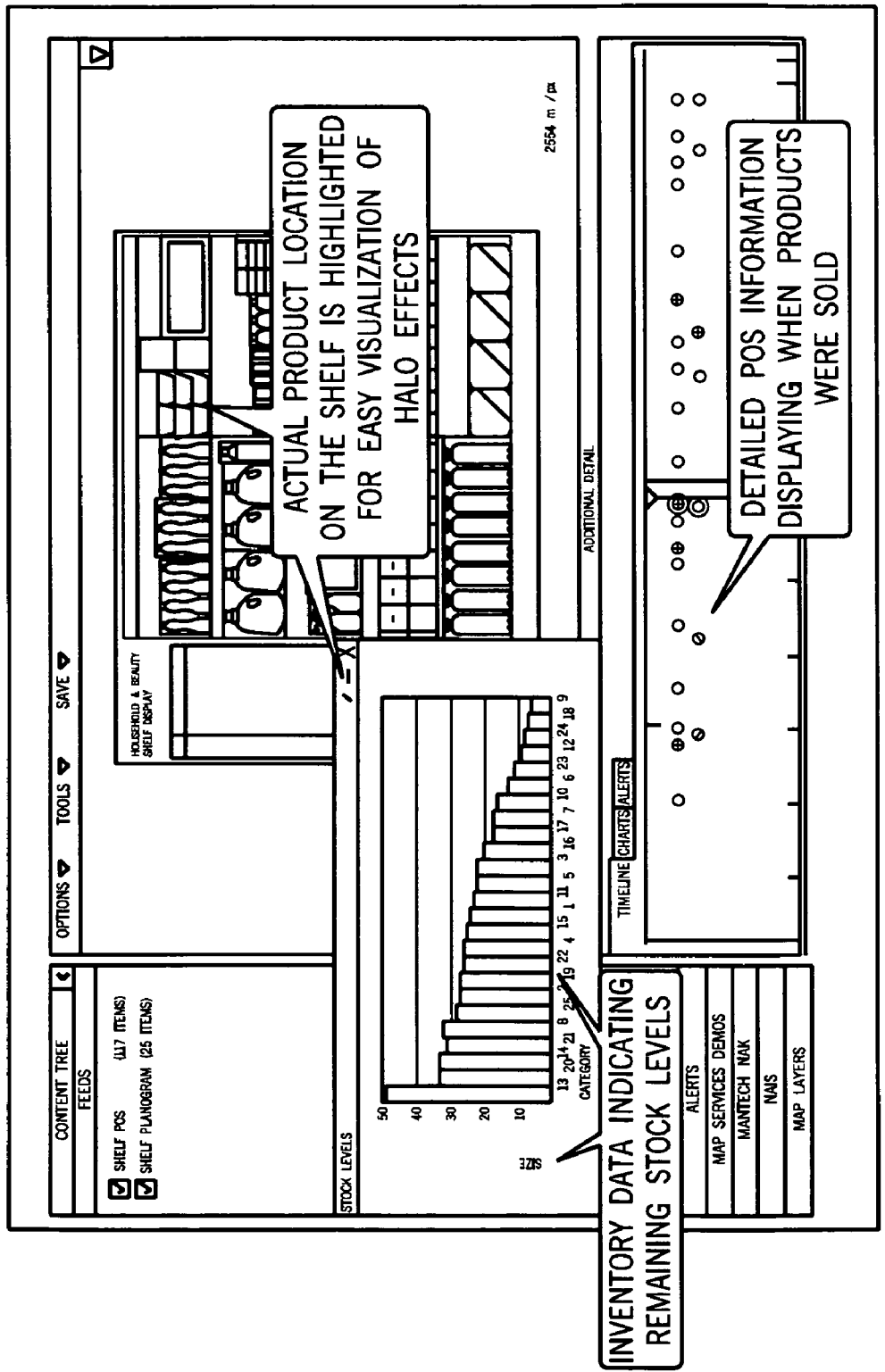
FIG. 23 illustrates one exemplary embodiment depicting shelf-level performance correlated with inventory level and product positions according to the present method and apparatus.

FIG. 23 illustrates one exemplary embodiment depicting shelf-level performance correlated with inventory level and product positions according to the present method and apparatus.

In general a planogram is a diagram of fixtures and products that illustrates how and where retail products should be displayed, usually on a store shelf in order to increase customer purchases. A planogram is often received before a product reaches a store, and is useful when a retailer wants multiple store displays to have the same look and feel. Often a consumer packaged goods manufacturer will release a new suggested planogram with a new product, to show how it relates to existing products in a certain category. Planograms differ significantly by retail sector. Fast-moving consumer goods organizations and supermarkets largely use text and box based planograms that optimise shelf space, inventory turns, and profit margins. Apparel brands and retailers are more focused on presentation and use pictorial planograms that illustrate "the look" and also identify each product.

Planograms are also a tool used by retailers to optimize the layout and location of merchandise. In this application the planogram is a visual planning tool used by merchants and planners to analyze, plan and communicate to stores how product should be laid out and configured. Retailers utilize this application of the planogram more than consumer goods manufacturers. For the most part, retailers guard their planograms closely as competitive information.

While analyzing customer data to improve store clustering as outlined above is a specific and focused application, the flexibility of thincVIew enables a user to perform many different types of analysis from the same application. Starting again at the same display of customer and store locations, the user can elect to display additional map layers, in this case a representative store floor plan, and zoom in to view sales and inventory data for a specific floor down to the shelf level. FIGS. 22 and 23 illustrate these different views.

While the planogram is a key tool for space planning and product layout, this visually rich tool is often not used for measurement but replaced by simple bar graphs and pie charts. The thincVIew enables retailers to dynamically link actual product performance data to each planogram, whether it's store specific or down to a shelf level. Easily integrating to perpetual inventory systems, POS data, RFID or scanner data, etc., this solution helps retailers to bridge the gap between planning and execution by offering a visually-driven measurement tool that works directly through a web browser.

Many companies do planograms or even planogram measurement. However, embodiments of the present method and apparatus do this and more. The present embodiments do it all from one map/system (from a high level map one can then drill into a store, etc.) and combine the various media together. Disparate planning processes are brought together. Previously, the merchandise arrangement and planogram process is performed in a different discipline versus the customer segmentation versus the supplier performance measurement. The present embodiments bring together all the functions into one system: it's no longer planning in a visual medium and then measuring in a static medium.

In a further embodiment the floor plan may be just a data representation of the configuration of the shelves in a store. This embodiment may then be utilized to determine and analyze the location and other parameters of the products on the shelves. Thus the term "predetermined floor plan layout" may also be defined as simply the arrangement of the shelves in the store just by themselves or in combination with aisles in the store.

Because thincVIew is easily integrated with existing systems and is accessible via a web browser, retailers can allow key suppliers access to this data as well. They can quickly gauge compliance with programs by product type, by location, by geography, etc. Both retailer and supplier can collaborate on key performance metrics and view the results in real-time in a visually compelling tool that uses the same diagrams and visuals as the planning process. For the first time, retailers and suppliers can close the loop and measure in the same manner, which they plan.

In one example, the predetermined floor plan layout of the store may comprise a plurality of aisles having a plurality of shelves. A plurality of products may be positioned on the plurality of shelves, and each product on a particular shelf in a particular aisle may be depicted in a geographical display. Sales of each product may be depicted in a in time line display that is linked to the geographical display.

The features of event aging and event replay may be implemented in a manner similar to that of the other features of timelines in web pages of thin clients as described above.

A further feature that may be implemented in the above-described display of temporal data in a timeline and in other visualizations according to the present method and apparatus is a toolbar button that effects panning of timeline data to the current time.

A further feature that may be implemented in the above-described display of temporal data in a timeline and in other visualizations according to the present method and apparatus is an optimized view on the timeline of selected data points, such as automatically setting scale, zoom level, etc to show an optimal view of a selected subset of data points.

It is to be understood that the term "product" may refer to any type of item, group of items, system, service, etc. It is further to be understood that the sales of a product includes any type of conveyance of the product to a customer, including giving the product to the customer at no charge. It is also to be understood that as used herein the terms "aisles" and "shelves" may refer to any devices and configurations for displaying products for sale.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A computer-implemented method for analyzing customer-based business data, comprising the steps of:
   streaming customer-based business data related to customers and their shopping transactions from data sources operatively coupled to the internet, including servers, computer systems and sensors, to a client computer system;
   displaying customer-based business data on a map or other geographic representation in a first window within a web browser on the client computer system;
   displaying customer-based business data on a timeline in the first or a second window within the web browser on the client computer system;
   linking and correlating the customer-based business data between the displays in the web browser to form mashup data; and
   displaying additional map layers comprising store locations wherein an additional map layer further comprises a representative store floor plan having at least one aisle and at least one shelf, and wherein the method further comprises zooming in to view sales and inventory data for a specific floor, a specific aisle, and a specific shelf of the store floor plan.

2. The method according to claim 1, further comprising the step of displaying geospatial and temporal shopping patterns of customers associated with the customer-based business data.

3. The method according to claim 1, wherein customers are grouped into at least three customer segments: "brand aspirationals", "value-price shoppers", and "price-sensitive affluents" based on customer demographics and buying habits.

4. The method according to claim 1, wherein the time and location of purchases of specific customers may be identified in the displayed customer-based business data.

5. The method according to claim 1, wherein the customer-based business data includes customer transactions that are time-stamped and geo-coded.

6. The method according to claim 5, wherein the linking and correlating step further includes the step of analyzing and fusing different sources of customer-based business data.

7. The method according to claim 1, wherein retailers identify buying patterns within or among key customer segments which drive more targeted promotions, better merchandising, improved product mix, and modified store hours for greater sales per square foot.

8. The method according to claim 1, further comprising the step of displaying at least one planogram, and wherein product performance data is dynamically linked to each planogram, and wherein the linked planogram and product performance data is at least one of the store specific, and shelf level specific.

9. The method according to claim 8, wherein the planogram and the product performance data is integrated with at least one of perpetual inventory systems, POS data, and RFID data and scanner data.

10. The method according to claim 1, wherein retailers and suppliers are allowed access to the mashup data, and wherein the retailers and suppliers gauge compliance with programs by at least one of product type, location, and geography.

11. The method according to claim 10, wherein the retailer and supplier collaborate on key performance metrics and view results in real-time using the web browser with common diagrams and visuals that are the same as in a planning process.

12. A computer-implemented method for analyzing customer-based business data, comprising the steps of:
providing a web browser-based thin client for having GIS (Geographic Information System) functionality for displaying map and image data;
streaming customer-based business data in the form of GML (geographic markup language, KML (Keyhole Markup Language) or GPX (GPS Tracks) data from sources operatively coupled to the internet to the thin client;
displaying customer-based business data on a map or other geographic representation in a first window within a web browser-based thin client;
displaying customer-based business data on a timeline in the first or a second window within the web browser-based thin client;
displaying customer-based business data using visual analysis metaphors in the first, the second or a third window within the web browser-based thin client;
linking and correlating the customer-based business data between the displays in the web browser-based thin client to form mashup data.

13. The method of claim 12 wherein the visual analysis metaphors include at least time wheel, node and link graphs and standard business charts.

14. The method of claim 12 wherein the linking and correlating step further includes the step of analyzing and fusing different sources of customer-based business data.

15. The method according to claim 12, wherein the method further comprises displaying additional map layers comprising store locations.

16. The method according to claim 15, wherein an additional map layer is a representative store floor plan having at least one aisle and at least one shelf, and wherein the method further comprises zooming in to view sales and inventory data for a specific floor, a specific aisle, and a specific shelf of the store floor plan.

17. The method according to claim 16, further comprising the step of displaying at least one planogram, and wherein product performance data is dynamically linked to each planogram, and wherein the linked planogram and product performance data is at least one of the store specific, and shelf level specific.

18. The method according to claim 17, wherein the planogram and the product performance data is integrated with at least one of perpetual inventory systems, POS data, and RFID data and scanner data.

* * * * *